US012634272B2

(12) United States Patent
Arngren et al.

(10) Patent No.: US 12,634,272 B2
(45) Date of Patent: May 19, 2026

(54) AUTHENTICATION OF USER TAGS OBTAINING COMMUNICATION SERVICES VIA I/O USER DEVICES PERFORMING USER TERMINAL EMULATION AS A CLOUD COMPUTING SERVICE

(71) Applicant: Telefonaktiebolaget LM Ericsson (publ), Stockholm (SE)

(72) Inventors: Tommy Arngren, Södra Sunderbyn (SE); Bernard Smeets, Dalby (SE); Peter Ökvist, Luleå (SE); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 18/850,299

(22) PCT Filed: Apr. 28, 2022

(86) PCT No.: PCT/EP2022/061395
§ 371 (c)(1),
(2) Date: Sep. 24, 2024

(87) PCT Pub. No.: WO2023/208354
PCT Pub. Date: Nov. 2, 2023

(65) Prior Publication Data
US 2025/0220010 A1     Jul. 3, 2025

(51) Int. Cl.
*H04L 9/40* (2022.01)
*H04L 67/08* (2022.01)
*H04W 12/069* (2021.01)

(52) U.S. Cl.
CPC ............ *H04L 63/08* (2013.01); *H04L 63/162* (2013.01); *H04L 67/08* (2013.01); *H04W 12/069* (2021.01)

(58) Field of Classification Search
CPC ......... H04L 63/08; H04L 9/32; H04L 63/162; H04L 67/08; H04W 12/069
(Continued)

(56) References Cited

U.S. PATENT DOCUMENTS 9,807,088 B2 * 10/2017 Mestanov ........... H04L 63/0853
2008/0141031 A1     6/2008 Oba et al.
(Continued)

FOREIGN PATENT DOCUMENTS

WO     2021047924 A1     3/2021

OTHER PUBLICATIONS

International Search Report and Written Opinion of the International Searching Authority, PCT/EP2022/061395, mailed Dec. 2, 2022, 20 pages.
(Continued)

*Primary Examiner* — Frantz B Jean
(74) *Attorney, Agent, or Firm* — Sage Patent Group

(57)     ABSTRACT
A user terminal emulation server establishes a secure channel connection with a first I/O user device using a session identifier and an identifier associated with the first I/O user device to determine a first I/O user device specific key generated from a master key, the first I/O user device specific key and the session identifier being used for secure communication of messages with the first I/O user device. An indication of an I/O user interface capability of the first I/O user device is received through the secure channel connection with the first I/O user device. The user terminal emulation server communicates with the first I/O user device to use the I/O user interface capability to provide at least part of the communication service for a user.

20 Claims, 10 Drawing Sheets

(58) Field of Classification Search
USPC ............................................................ 726/4
See application file for complete search history.

(56) References Cited

U.S. PATENT DOCUMENTS

| | | | |
|---|---|---|---|
| 2011/0154454 A1* | 6/2011 | Frelechoux | H04L 63/0892 |
| | | | 726/5 |
| 2013/0176897 A1 | 7/2013 | Wang et al. | |
| 2014/0165170 A1* | 6/2014 | Dmitriev | H04W 12/069 |
| | | | 726/7 |
| 2021/0344520 A1* | 11/2021 | Hannu | H04N 21/4104 |
| 2022/0132315 A1* | 4/2022 | Kolekar | H04W 12/106 |

OTHER PUBLICATIONS

3GPP TS 33.501 V17.5.0 (Mar. 2022); 3rd Generation Partnership Project; Technical Specification Group Services and System Aspects; Security architecture and procedures for 5G system (Release 17), 293 pages.

ETSI TS 133 535 V16.1.0 (Nov. 2020); Technical Specification; 5G; Authentication and Key Management for Applications (AKMA) based on 3GPP credentials in the 5G System (5GS) (3GPP TS 33.535 version 16.1.0 Release 16), 21 pages.

Aboba, B. et al., "Extensible Authentication Protocol (EAP) Key Management Framework," Network Working Group, Request for Comments: 5247 (RFP 5247), Aug. 2008, 79 pages.

* cited by examiner

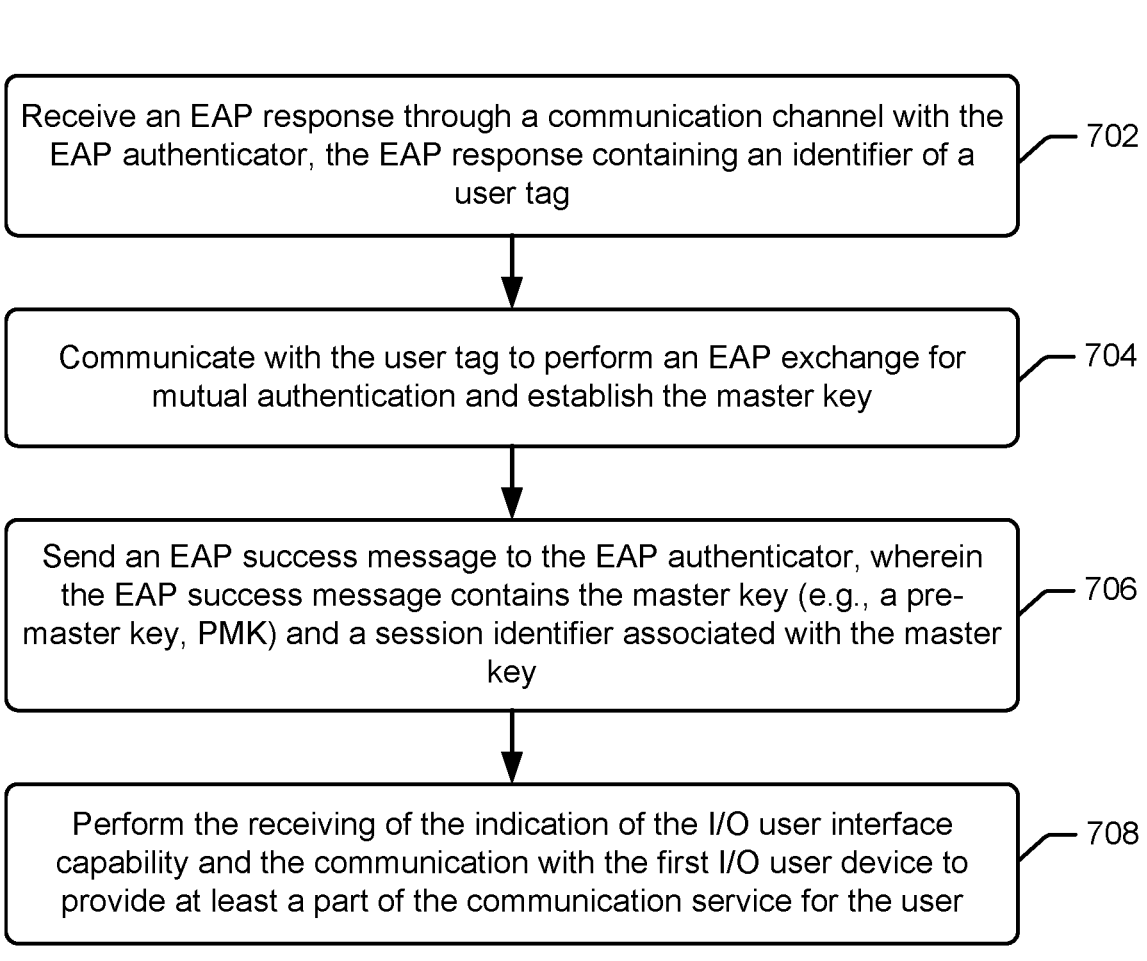

Establish a secure channel connection with a first I/O user device — 600

Receive an indication of an I/O user interface capability of the first I/O user device through the secure channel connection — 602

Communicate with the first I/O user device to use the I/O user interface capability to provide at least part of the communication service for a user — 604

Figure 6

Receive an EAP response through a communication channel with the EAP authenticator, the EAP response containing an identifier of a user tag — 702

Communicate with the user tag to perform an EAP exchange for mutual authentication and establish the master key — 704

Send an EAP success message to the EAP authenticator, wherein the EAP success message contains the master key (e.g., a pre-master key, PMK) and a session identifier associated with the master key — 706

Perform the receiving of the indication of the I/O user interface capability and the communication with the first I/O user device to provide at least a part of the communication service for the user — 708

Figure 7

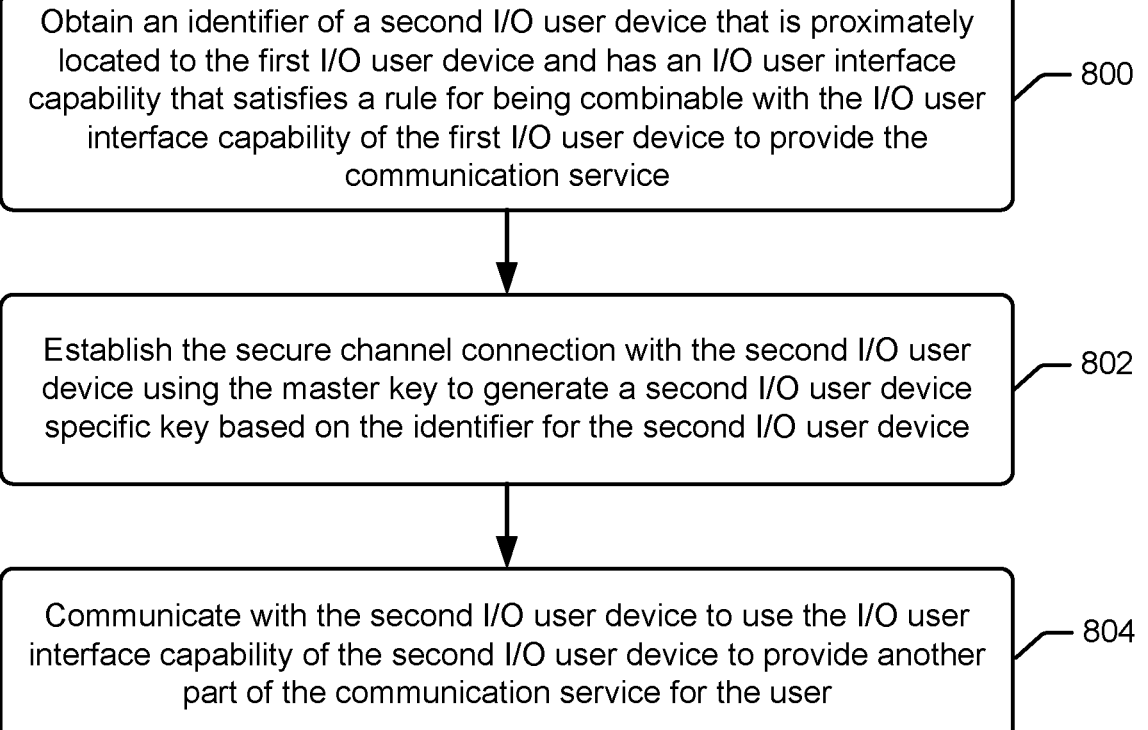

Obtain an identifier of a second I/O user device that is proximately located to the first I/O user device and has an I/O user interface capability that satisfies a rule for being combinable with the I/O user interface capability of the first I/O user device to provide the communication service ⟋— 800

Establish the secure channel connection with the second I/O user device using the master key to generate a second I/O user device specific key based on the identifier for the second I/O user device ⟋— 802

Communicate with the second I/O user device to use the I/O user interface capability of the second I/O user device to provide another part of the communication service for the user ⟋— 804

*Figure 8*

AUTHENTICATION OF USER TAGS OBTAINING COMMUNICATION SERVICES VIA I/O USER DEVICES PERFORMING USER TERMINAL EMULATION AS A CLOUD COMPUTING SERVICE

CROSS REFERENCE TO RELATED APPLICATIONS

This application is a 35 U.S.C. § 371 national stage application of PCT International Application No. PCT/EP2022/061395 filed on Apr. 28, 2022, the disclosure and content of which is incorporated by reference herein in its entirety.

TECHNICAL FIELD

The present disclosure relates to providing communication services through user terminals of a wireless communications system.

BACKGROUND

The market for user terminals is driven by the quest to provide users with increasingly advanced communication and other operational features within the constraints of a portable handheld form factor. The development requirements for user terminal are increasingly complex as designers seek to integrate a greater variety of user interfaces and advanced operational features within the portable handheld form factor. Advancements in operational features have required more highly integrated and faster processing circuits with greater circuit densities, which becomes more difficult under constraints on costs and power consumption.

This all-inclusive feature-rich approach for user terminal development does not satisfy all of the myriad of differing desires held by consumers seeking solutions for the rapidly expanding variety of communication services. Moreover, the always-connected expectations of today's society obligates users to vigilantly keep their user terminals within reach or risk being unable to timely receive or initiate communication services.

SUMMARY

Some embodiments disclosed herein are directed to a user terminal emulation server for providing a communication service through input and/or output (I/O) user devices. The user terminal emulation server establishes a secure channel connection with a first I/O user device using a session identifier and an identifier associated with the first I/O user device to determine a first I/O user device specific key generated from a master key, the first I/O user device specific key and the session identifier being used for secure communication of messages with the first I/O user device. The user terminal emulation server receives an indication of an I/O user interface capability of the first I/O user device through the secure channel connection with the first I/O user device. The user terminal emulation server then communicates with the first I/O user device to use the I/O user interface capability to provide at least part of the communication service for a user.

Some other related embodiments disclosed herein are directed to an EAP authenticator that includes at least one processor and at least one memory storing program code that is executable by the at least one processor to perform operations. The operations include to receive, from the first I/O user device, an EAP response which contains the identifier of the user tag containing an address of a user terminal emulation application hosted by a user terminal emulation server. The operations establish a communication channel with the user terminal emulation application based on the address in the user tag of the user terminal emulation application. The operations send at least one EAP message based on the EAP response through the communication channel with the user terminal emulation application, and receive an EAP success message from the user terminal emulation application where the EAP success message contains a master key and a session identifier. The operations generate, based on the master key, a first I/O user device specific key, and send to the first I/O user device the first I/O user device specific key, the session identifier, and the address for the user terminal emulation application.

Some other related embodiments disclosed herein are directed to a first I/O user device that includes at least one processor and at least one memory storing program code that is executable by the at least one processor to perform operations. The operations include to receive from a user tag an attach request, and forward the attach request to an authenticator. The operations forward to the user tag an identity request received from the authenticator. The operations forward to the authenticator a response received from the user tag, the response which contains an identifier of the user tag containing an address of a user terminal emulation application hosted by a user terminal emulation server. The operations receive from the authenticator a message comprising a first I/O user device specific key for the first I/O user device, a session identifier, and the address for the user terminal emulation application. The operations establish a secure channel connection with the user terminal emulation application using the first I/O user device specific key and the session identifier received from the authenticator. The operations send an indication of an I/O user interface capability of the first I/O user device to the user terminal emulation application through the secure channel connection. The operations communicate with the user terminal emulation server to use the I/O user interface capability of the first I/O user device to provide at least part of a communication service to a user.

Some other related embodiments disclosed herein are directed to a user tag which is transportable by a user and comprising circuitry configured to send to a first I/O user device an attach request, and receive from the first I/O user device an identity request by an authenticator. The circuitry sends to the first I/O user device a response which contains an identifier of the user tag and an address of a user terminal emulation application hosted by a user terminal emulation server. The circuitry communicates with the user terminal emulation application to perform an exchange for mutual authentication and establish a master key used to generate one or more I/O user device specific keys.

Some potential advantages of these and related embodiments include that a user can receive and initiate communication services without the necessity of a traditional all-inclusive feature-rich user terminal. The centralized server-based approach emulates a user terminal using one or more networked I/O user devices that are proximately located to a user, and which individually or combinable have user interface (UI) capabilities to provide an I/O user interface for the user to interface with a user terminal emulation application of the server to perform a communication service. The server-based approach can provide low-cost adaptable communication services to users. It can be desirable to provide operation for a virtual instance, e.g., virtual terminal emulation application, in the cloud, e.g., user terminal emulation server, to dynamically secure use of physical resources using authentication and key establishment procedures. With such operations, it is possible that a virtual instance associated with a user will be able to securely couple physical resources to the location of the user and enable the virtual instance to use those proximately located physical resources. Present embodiments can use a trusted party (function) to enable secure access and communications between a cloud service, e.g., user terminal emulation server and I/O user device(s).

Other user terminal emulation servers, authenticators, I/O user devices, and user tags according to embodiments of the inventive subject matter will be or become apparent to one with skill in the art upon review of the following drawings and detailed description. It is intended that all such additional user terminal emulation servers, authenticators, I/O user devices, and user tags be included within this description, be within the scope of the present inventive subject matter, and be protected by the accompanying claims. Moreover, it is intended that all embodiments disclosed herein can be implemented individually or combined in any way and/or combination

BRIEF DESCRIPTION OF THE DRAWINGS

Aspects of the present disclosure are illustrated by way of example and are not limited by the accompanying drawings. In the drawings:

FIGS. 6-8 illustrate flowcharts of operations that may be performed by a user terminal emulation server in accordance with some embodiments of the present disclosure;

DETAILED DESCRIPTION

Figure 1:
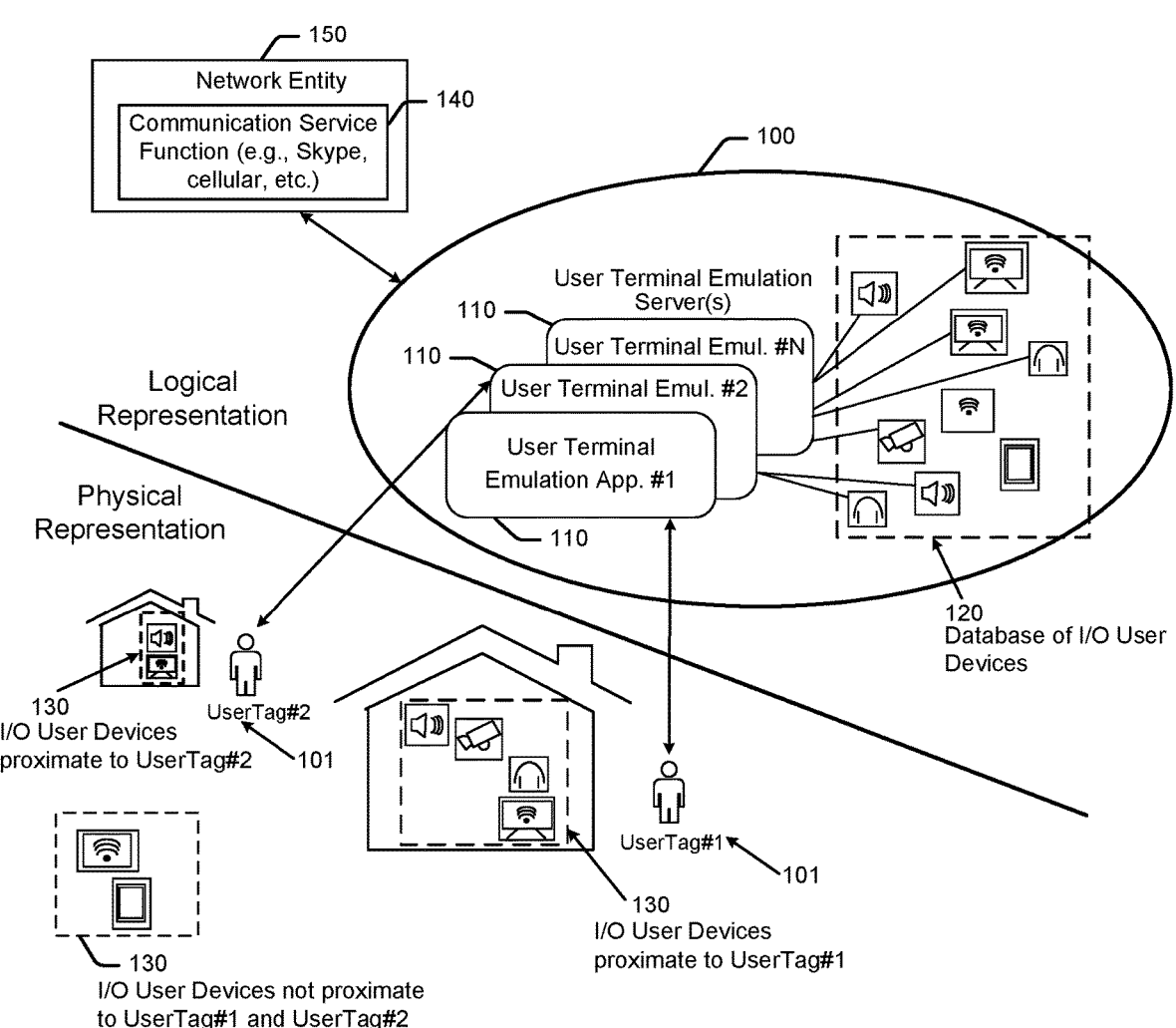
FIG. 1 illustrates a system with a user terminal emulation server that operationally integrates sets of I/O user devices that are proximately located to users to logically form virtualized user terminals providing communication services in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments disclosed herein are directed to improvements in operation of a centralized server based approach for emulating a user terminal using one or more networked input and/or output (I/O) user devices that are proximately located to a user, and which individually or combinable have user interface (UI) capabilities to provide an I/O user interface for the user to interface with a user terminal emulation application of the server to perform a communication service.

Some potential advantages of these embodiments include that a user can obtain a communication service without the necessity of a traditional all-inclusive feature-rich user terminal, i.e., a conventional smartphone, mobile phone, tablet computer, etc. A user terminal emulation server can utilize the available UI capability of one or more I/O user devices that are proximate to a user to provide user terminal functionality for a communication service. The server-based approach can provide low-cost adaptable communication services to users.

Dynamic allocation of I/O user device capabilities whenever and wherever the I/O user devices are in the proximity of a user enables efficient and flexible use of existing hardware, such as televisions, conference phones, laptops, surveillance cameras, connected household appliances, connected cars, etc., that is capable of providing necessary UI functionality to user during a communication service. The user thereby has reduced or no need to carry an expensive and all-inclusive user terminal, e.g. smart phone, that includes all necessary UI capabilities, display device, keyboard, speakers, etc. The user may instead carry a hardware device which operates to identify the user, referred to as a "UserTag" or "user tag", over a wireless or wired (e.g., smartcard reader) communication interface, such as a near field communication (NFC) interface, to one or more of the I/O user devices. Various embodiments disclosed herein may disrupt the traditional handset-centric mobile communication industry as the features and capabilities of what forms a user terminal are not constrained to the domain of mobile phone manufacturers. A user terminal emulation server can operate to provide a user terminal, which can also be referred to as a SoftUE or a user terminal emulation application that is run by the user terminal emulation server.

FIG. 1 illustrates a system with a user terminal emulation server 100 that can use one or more I/O user devices 130 that is/are proximately located to users to logically emulate a user terminal providing a communication service in accordance with some embodiments of the present disclosure. The user terminal emulation server 100 may operationally integrate the UI capabilities of a set of the I/O user devices 130 to logically emulate a user terminal providing communication services in accordance with some embodiments of the present disclosure.

Referring to FIG. 1, the user terminal emulation server 100 may be a cloud resource that is networked and remote from the I/O user devices 130, or may be more proximately located on a shared network with the I/O user devices 130. The user terminal emulation server 100 is configured to communicate with the I/O user device(s) 130 proximately to a user for use in providing UI capabilities during a communication service.

Users may carry a hardware tag, a.k.a. "UserTag" or "user tag", which is capable of transmitting a unique user identifier through a communications interface, such as a near-field communications interface (e.g., Bluetooth, BLE, NFC, RFID, etc., or combinations thereof), for receipt by one or more of the I/O user devices 130 which are proximately located to the user. One type of UserTag can be a low-complexity stand-alone electronic device having limited capability for transmitting an identifier through a near-field communications interface and performing authentication operations such as described herein. Another type of UserTag can be a smartphone or smartwatch having cellular connectivity that transmits a cellular identity (e.g., from a SIM card) or an application identity through a cellular interface or a near-field communications interface and is configured to perform authentication operations such as described herein.

The user identifier may alternatively or additionally be operationally determined by biometrics operations performed by, e.g., one or more of the I/O user devices 130. The biometrics operations may include, without limitation, one or more of voice recognition, image/face recognition, eye recognition, fingerprint recognition, or a combination thereof. The user identity may be determined based on credential provided by the user when, e.g., logging into an application or account. The user identity may be provided by a cell phone using information from the subscription SIM and proximity of the cell phone to one or more of the I/O user devices 130 can be determined using the phone's near-field communications (NFC) capability.

A user identifier, a UserTag identifier, and a user terminal emulation application 110 can be logically associated with each other in a database 120 during a user registration process or as part of another setup process. For example, during a user registration process a user may obtain an account login identifier (serving as the user identifier) that is registered in the database 120 as being associated with a UserTag identifier for a physical UserTag that has been provided to (e.g., purchased by) the user and being associated with a user terminal application 110 that emulates a user terminal having defined capabilities (e.g., a cell phone providing cellular and over-the-type voice-over-IP communication services).

The user terminal emulation server 100 may maintain in the database 120 network addresses of I/O user devices 130 and UI capabilities of the I/O user devices 130. The capabilities of the I/O user devices 130 may be logically arranged in the database 120 based on the type of UI capability provided, e.g., display device, microphone, speaker, keyboard, and may be further arranged based on a quality of service provided by the UI capability.

The user terminal emulation server 100 may register a network address of one of the user terminal emulation applications 110 and an identity of a user with a network entity 150 providing communication services. The network entity 150 provides a communication service function 140 which may, for example, correspond to an over-the-top Voice Over Internet Protocol (VoIP) service, Netflix service, Facebook service, Microsoft Teams meeting service, Internet browser service, a cellular communication service, etc. The user terminal emulation application 110 is executed by the user terminal emulation server 100. A user terminal emulation application 110 may run one or more applications that are normally run by a smart phone, such as a Netflix application, Facebook application, Microsoft Teams application, Internet browser application, etc.

As illustrated in FIG. 1, a different instantiation of the user terminal emulation application 110 may be hosted by the server 100 for each user who is to be provided communication services (i.e., illustrated user terminal emulation applications #1-#N corresponding to users 1-N). The user terminal emulation application 110 may perform registration of the user with the network entity 150 and setup of a communication service with a user responsive to communication requests.

When the communication service function 140 of the network entity 150 is a VoIP service, the operation to register the network address of the user terminal emulation application and the identity of the user with the network entity can include registering the network address of the user terminal emulation application 110 and the identity of the user with a network server of a VoIP communication service provider.

When the communication service function 140 of the network entity 150 is a cellular communication service, the operation to register the network address of the user terminal emulation application and the identity of the user with the network entity can include registering the network address of the user terminal emulation application 110 and the identity of the user with a Home Subscriber Server (HSS) or other network node of a core network operated by a cellular communication service provider.

The user terminal emulation server 100 may receive the registration messages from the I/O user devices using the Session Initiation Protocol (SIP)/Session Description Protocol (SDP), where each of the registration messages identifies the network address and the UI capability of one of the I/O user devices. The communication request may be received from the network entity 150 using the SIP/SDP, and the operation to provide communication sessions between the user terminal emulation application 110 and each of the I/O user devices in the set, and between the user terminal emulation application 110 and the requesting user terminal may be performing using the SIP/SDP.

A registration message from an I/O user device can include, for example, an IP address and port number, MAC address, fully qualified domain name (FQDN), and/or another network address, and further include information identifying the UI capability of the I/O user device. The I/O user device may respond to becoming powered-on by communicating the registration message to the user terminal emulation server 100.

The user terminal emulation server 100 receives a communication request from the network entity 150 for establishing a communication service between the user and a requesting user terminal, e.g., a cellular phone, computer with Microsoft Teams application, etc. Responsive to the communication request, the user terminal emulation server 100 identifies one or more of the I/O user devices 130, which may be registered in the database, that are proximately located to a location of the user and are determined, based on the UI capabilities identified by the database 120 for the set of I/O user devices and based on content of the communication request, to satisfy a capability rule for being individually usable or combinable to provide an I/O user interface for the user to interface with the user terminal emulation application 110 to provide the communication service. Although various operations are described above and elsewhere as being performed by the user terminal emulation server 100, it is to be understood that these and other operations are performed by the user terminal emulation server 100 executing one or more of the user terminal emulation applications 110 instantiated for a user.

The user terminal emulation server 100 provides one or more communication sessions between the user terminal emulation application 110 and the one or more I/O user devices 130 and between the user terminal emulation application 110 and the requesting user terminal via the network entity 150. The communication request that is received by the user terminal emulation application 110 may contain an indication of a minimum UI capability that must be provided to the user during the communication service, such as: speaker only; combination of speaker and microphone; display only; combination of display device, speaker, and microphone; etc. A UI capability rule which can be used by the server 100 to determine whether a communication service can be provided and by which set of I/O user devices, may thereby be defined based on the minimum UI capability that is indicated by the communication request.

The user terminal emulation server 100 then routes communication traffic that is received from at least one of the I/O user devices in the set toward the requesting user terminal via the network entity 150. In some embodiments, for each data type that is received as communication traffic from the requesting user terminal, the user terminal emulation server 100 selects one of the I/O user devices from among the set of I/O user devices based on matching characteristics of the data type to the UI capabilities identified by the database 120 for the one of the I/O user devices, and then routes the data of the data type toward the network address of the selected one of the I/O user devices.

As will be explained in further detail below, the server 100 may also combine data streams that are received from the I/O user devices in the set, and route the combined data streams towards the requesting user terminal, e.g., via the network entity 150.

The user terminal emulation server 100 (e.g., the application 110 or an I/O user device handler described below) may be responsible for tracking which I/O user devices are proximately located to a present location of the user. The server 100 can receive presence reports from individual ones of the I/O user devices containing their network address and an identifier of a user who is determined by the I/O user device to be proximately located. For example, an I/O user device may read a user tag through a NFC communication interface, may sense biometric information from the user, and/or may perform other operations to detect presence of a user and to identify the user. Responsive to the presence reports, the server 100 updates the database 120 to indicate which user identifiers are proximately located to which of the I/O user devices.

With further reference to the example system of FIG. 1, a set of I/O user devices 130 has been determined by the instantiated user terminal emulation application #1 to be proximately located to a location of a first user carrying UserTag #1, and to further have UI capabilities that are combinable to satisfy the UI capability rule for providing a combined I/O user interface for the first user to use during a requested communication service. Application #1 responsively uses that set of I/O user devices 130 to provide a combined I/O user interface for use by the first user during a communication service via network entity 150 between the first user and another user terminal.

Similarly, another set of I/O user devices 130 has been determined by the instantiated user terminal emulation application #2 to be proximately located to a location of a second user carrying UserTag #2, and to further have UI capabilities that are combinable to satisfy the UI capability rule for providing a combined I/O user interface for the second user to use during a requested communication service. Application #2 responsively uses that set of I/O user devices 130 to provide a combined I/O user interface for use by the second user during a communication service via network entity 150 between the second user and yet another user terminal.

FIG. 1 also illustrates that another set of I/O user devices 130 is not proximately located to either UserTag #1 or UserTag #2.

As explained above, the communication request which is requesting the establishment of communication service with an identified user may be initiated by the network entity 150 using the network address of the user terminal emulation application and identity of the user which were earlier registered with the network entity 150. However, the communication request may additionally or alternatively be generated by one of the I/O user devices 130 responsive to a command received from a proximately located user. For example, a user may operate a user interface provided by one of the I/O user devices 130 to initiate a combined audio and video call with another user. The user terminal emulation server 100 (e.g., the IODH or the application 110 for that user) receives the communication request along with the identity of the user, which may be sensed via the UserTag. The application 110 performs the identifying, providing, routing, selecting, and combining operations described above to set up and operate a communication service between the user and the other user via the network entity 150.

Further example systems and related operations will now be described to further illustrate how I/O user devices having different UI capabilities can be operationally used or combined to provide a combined UI that can be used by user to satisfy the communication requirements of a communication service.

Further illustrative operations are described regarding an example embodiment in which a speaker device is one of the I/O user devices 130 in the set capable of playing a received audio stream and a microphone device is one of the I/O user devices 130 in the set capable of sensing audio to provide a microphone stream. Operations by the user terminal emulation application include updating the database 120 based on content of registration messages from the speaker device and the microphone device to identify network addresses of the speaker device and the microphone device, and to identify UI capabilities of the speaker device as having a speaker capability and the microphone device as having a microphone capability. The speaker UI capabilities may identify a number of speakers provided, sound loudness capability, and/or other operational characteristics. The microphone UI capabilities may identify a number of microphones provided, sensitivity the microphones, and/or other operational characteristics. The speaker device and the microphone device are each identified as belonging to the set of I/O user devices that are determined to be proximately located to the location of the user (e.g., UserTag #1) and are further determined, based on the UI capabilities identified by the database 120, to satisfy the UI capability rule for used individually or combined to provide a combined I/O UI for the user to interface with the user terminal emulation application 110 to provide the communication service. Based on determining that the speaker device and the microphone device satisfy the UI capability rule, further operations are performed to route a microphone stream received from the microphone device toward the requesting user terminal (e.g., via network entity 150). When an audio stream is received as communication traffic from the requesting user terminal the operations select the speaker device based on matching an audio characteristic of the audio stream to the speaker capability identified by the database for the speaker device, and then route the audio stream toward the network address of the speaker device.

The example embodiment may include, when a display device is one of the I/O user devices in the set capable of displaying a received video stream, the operations update the database 120 based on content of registration messages to identify network addresses of the display device, and to identify UI capabilities of the display device as having a display capability. The display UI capabilities may identify a screen display size, aspect ratio, pixel resolution, video frame rates supported, whether display device supports shared user support via split screen configuration, and/or other operational characteristics. The display device is also identified as among the set of I/O user devices that determined, based on the UI capabilities identified by the database 120, to satisfy the UI capability rule for being used individually or combined to provide the combined I/O UI for the user to interface with the user terminal emulation application 110 to provide the communication service. In an optional further embodiment, the set of I/O user devices is further selected based on each of the I/O user devices satisfying a rule for being proximately located to the location of the user. Based on determining that the speaker device, the display device, and the microphone device satisfy the UI capability rule, further operations respond to receipt of video stream as communication traffic from the requesting user terminal by selecting the display device based on matching a video characteristic of the video stream to the display capability identified by the database 120 for the display device, and then routing the video stream toward the network address of the display device.

In the example embodiment the operations for routing the audio stream and the video stream toward the network addresses of the speaker device and the display device, respectively, may include when audio data and video data are received within a same stream from the requesting user terminal through a first communication session: separating the audio data from the video data; routing the audio data toward the network address of the speaker device through a second communication session; and routing the video data toward the network address of the display device through the second communication session or a third communication session.

The example embodiment may include, when a camera device is one of the I/O user devices in the set capable of providing a camera stream, the operations update the database 120 based on content of a registration message to identify a network address of the camera device and to identify a UI capability of the camera device as having a camera capability. The camera UI capabilities may identify a camera pixel count, image quality, light sensitivity, and/or other operational characteristics. The camera device is further identified as a member of the set of I/O user devices that are determined to be proximately located to the location of the user and is further determined, based on the UI capability identified by the database 120, to satisfy the UI capability rule for being used individually or combined with the other I/O user devices in the set to provide the combined I/O UI for the user to interface with the user terminal emulation application 110 to provide the communication service. Based on determining that the camera device satisfies the UI capability rule, further operations are performed to route the camera stream received from the camera device toward the requesting user terminal, e.g., via the network entity 150.

The operations for routing the microphone stream received from the microphone device and the camera stream received from the camera device toward the requesting user terminal, can include: receiving the microphone stream from the microphone device through a first communication session; receiving the camera stream from the camera device through the first communication session or a second communication session; combining the microphone stream and camera stream in a combined stream; and routing the combined stream toward the requesting user terminal through a third communication session, e.g., via the network entity 150.

The example embodiment may include, when a keyboard device is one of the I/O user devices in the set capable of outputting key selection data responsive to key selections by a user among keys of the keyboard device, the operations can update the database 120 based on content of a registration message to identify a network address of the keyboard device and to identify a UI capability of the keyboard device as having a keyboard capability. The keyboard device capabilities may identify a key count, indication of whether the keyboard is a physical keyboard or a touch sensitive input device, and/or other keyboard capabilities. The keyboard device is further identified as a member of the set of I/O user devices that are determined to be proximately located to the location of the user and is further determined, based on the UI capability identified by the database 120, to satisfy the UI capability rule for being used individually or combined with the other I/O user devices in the set to provide the combined I/O UI for the user to interface with the user terminal emulation application 110 to provide the communication service. Based on determining that the keyboard device satisfies the UI capability rule, further operations are performed to identify commands formed by the key selection data received from the keyboard and to perform operations that have been predefined as being triggered based on receipt of the identified commands.

The operations for routing the key selection data received from the keyboard device and microphone stream received from the microphone device, may include: receiving the key selection data from the keyboard device through a first communication session receiving the microphone stream from the microphone device through the first communication session or a second communication session; combining the key selection data and the microphone stream in a combined stream; and routing the combined stream toward the requesting user terminal through a third communication session, e.g., via the network entity 150.

Figure 2:
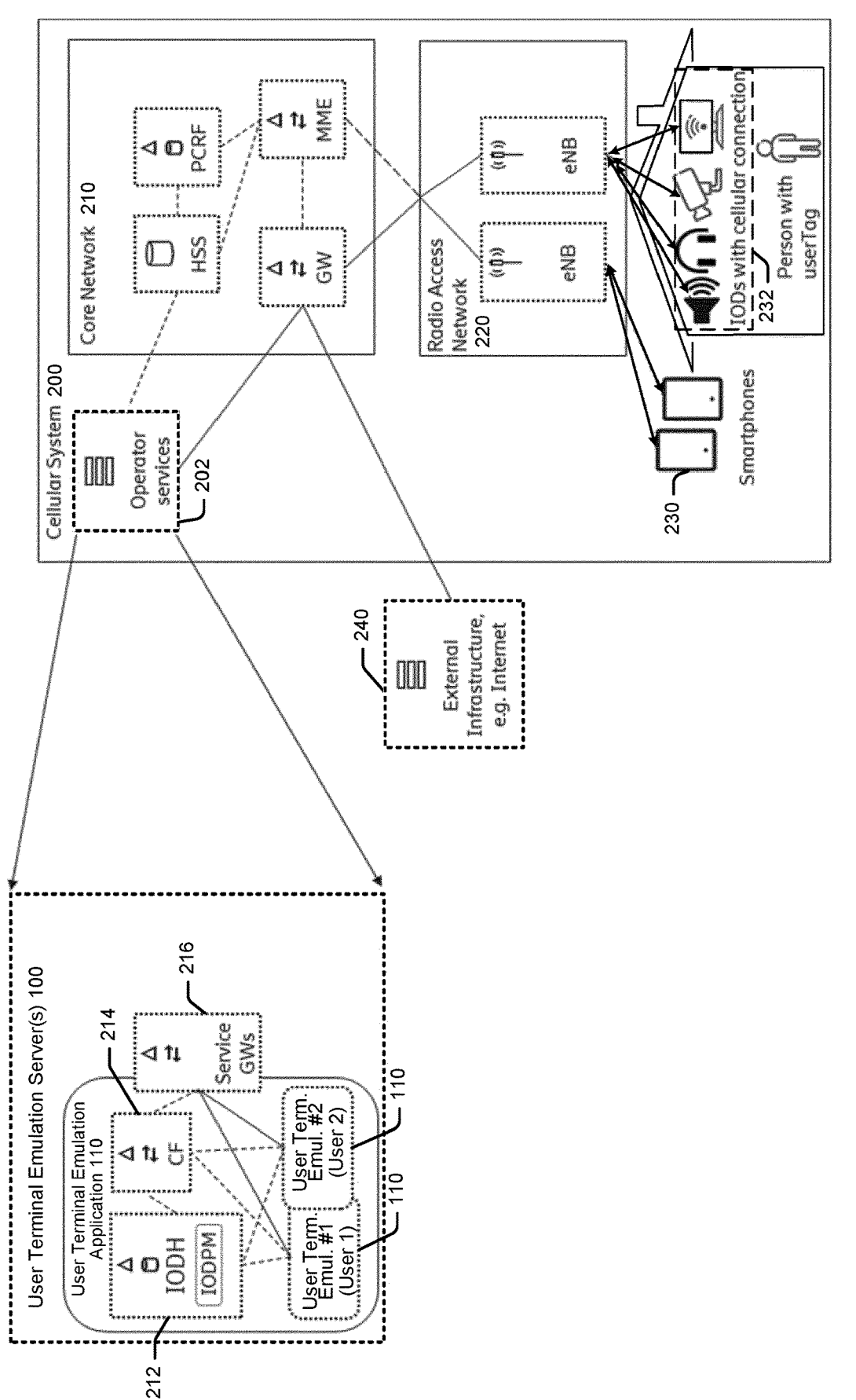
FIG. 2 illustrates a block diagram illustrating the user terminal emulation server communicating with various elements of a cellular system to provide communication services in accordance with some embodiments of the present disclosure.

FIG. 2 is a block diagram illustrating the user terminal emulation server 100 as an element of an operator service node 202 within a cellular system 200. Referring to FIG. 2, the communication service function of the network entity 140 (FIG. 1) may be provided by the operator service node 202 or may be reached through external infrastructure 240, e.g., the Internet. The server 100 may, for example, be implemented in the radio access network 220 to provide edge computing with faster responsiveness or may be implemented within another node of the cellular system 200. The user terminal emulation server 100 can include an I/O user device handler (IODH) 212, a control function (CF) 214, the instantiated user terminal emulation applications 110, and a service gateway (GW) 216. A user terminal emulation application 110 may perform one or more user applications which are provided by a smart phone, such as a Netflix application, Facebook application, Microsoft Teams application, Internet browser application, etc.

The IODH 212 may perform operations to manage the I/O user devices, such as to handle maintenance of the database 120 and/or perform registration of the user terminal emulation applications 110. For example, the IODH 212 may operate to register with a Microsoft Teams server the IP address of a Microsoft Teams application, which is run by or interfaced to the user terminal emulation application 110, and the user's Microsoft Teams name. The CF 214 may be responsible for assigning an IP address to each user terminal emulation application 110. The IP address to be assigned by the CF 214 may be received from the core network 210 functionality such as a PDN-GW. The service GW 216 may interconnect the user terminal emulation server 100 to a PSTN network, packet data network gateway of a 3GPP (3$^{rd}$ Generation Partnership Project) system, etc. The cellular system 200 can include a Core Network 210 having a Home Subscriber Server (HSS), a Policy and Charging Roles Function (PCRF), gateway (GW) and Mobility Management Entity (MME) providing control signaling related to mobile terminal mobility and security for the radio access. The HSS contains subscriber-related information and provides support functionality for user authentication and user access to the system. The PCRF enables QoS control per data flow and radio bearer, by setting QoS rules for each data flow, based on operator set policies and subscriber information. The GW can include a Serving GW (S-GW) and a Packet Data Network GW (PDN-GW), where the S-GW interconnects the core network 210 with the radio access network 220 and routes incoming and outgoing packets for the I/O user devices 232 and/or 130 and the user terminals 230. The PDN-GW interconnects the core network 210 with external infrastructure 240, such as the Internet, and allocates IP-addresses and performs policy control and charging.

Some I/O user devices 232 having cellular communication capability can communicate via, e.g., eNBs or other radio access nodes of a Radio Access Network 220 with the operator service node 202 via the core network 210. In the system of FIG. 2, the user terminal emulation server 100 may handle set up of a communication service between a selected set of the I/O user devices are proximate to a user and a remote user terminal 230 (e.g., smart phone) via the cellular system 200.

Figure 3:
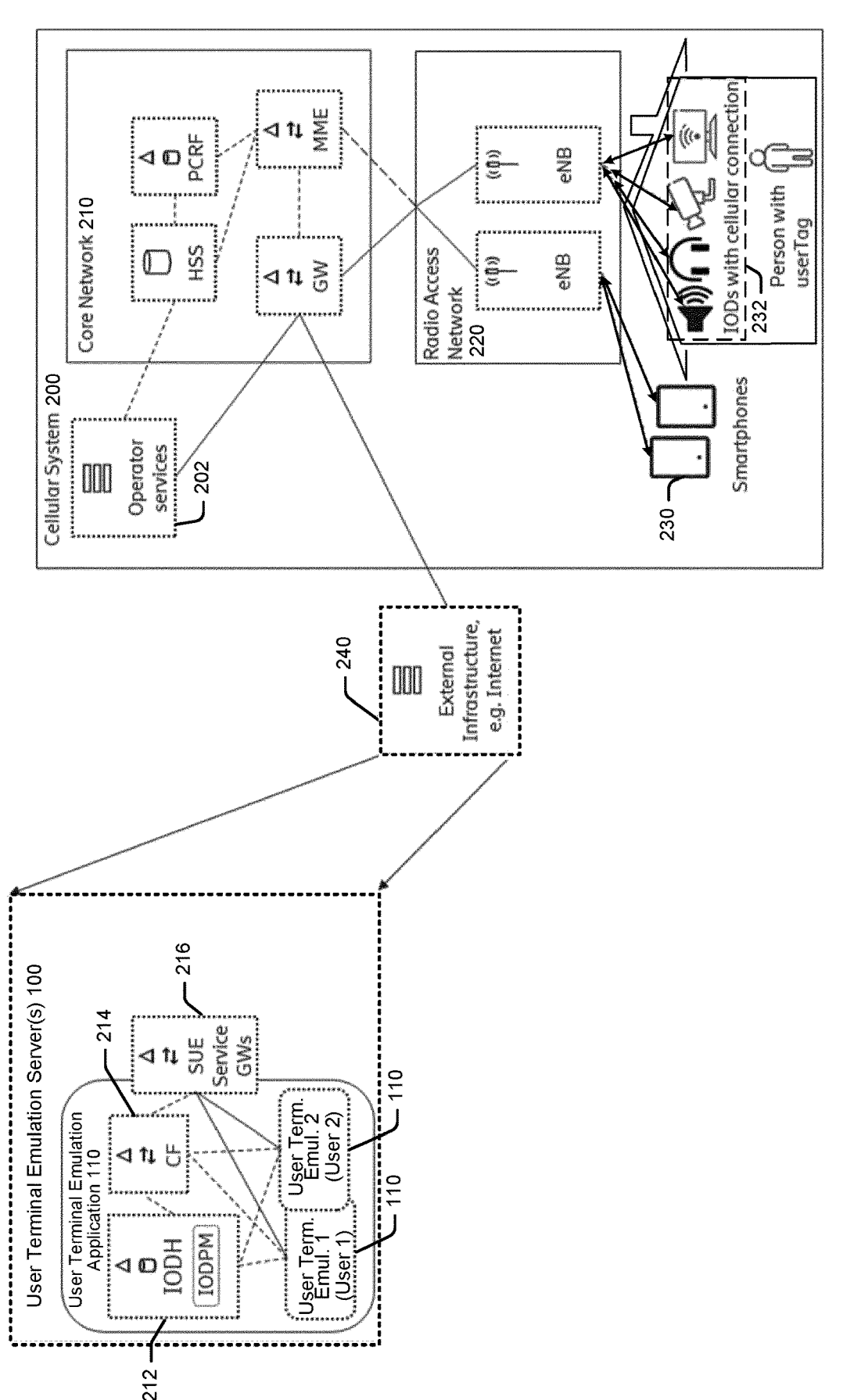
FIG. 3 illustrates a block diagram illustrating the user terminal emulation server communicating in a different manner with various elements of a cellular system to provide communication services in accordance with some other embodiments of the present disclosure.

FIG. 3 is a block diagram illustrating the user terminal emulation server 100 communicating in a different manner with various elements of a cellular system 200, which may operate as the network entity 140 (FIG. 1), to provide communication services in accordance with some embodiments of the present disclosure. The system of FIG. 3 differs from the system of FIG. 2 by the user terminal emulation server 100 being an Internet service within external infrastructure 240 outside of the cellular system 200. In the system of FIG. 3, the CF 214 may determine the IP address to be assigned to different ones of the user terminal emulation applications 110 based on signaling from the Internet service within the external infrastructure 240.

The above and other example operations will now be described in further detail in the context of three different example "use cases": 1) incoming call scenario; and 2) outgoing call scenario.

Use Case 1: Incoming Call Scenario

This use case involves a user, with a UserTag or other way of being identified, being proximately located to I/O user devices 130 having different UI capabilities when an incoming call is received by the user terminal emulation server. Although operations are explained below in the context of identifying a user through a physical UserTag carried by the user, these operations are not limited thereto and may be used with any other way of identifying a user, such as by sensing biometric information that identifies the user.

A user terminal emulation application 110 may be instantiated or otherwise activated responsive by an incoming call (service, session) targeting the UserTag. The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the incoming communication session. The user terminal emulation application 110 may ask the IODH to identify which I/O user devices 130 are proximately located to the UserTag, and may further ask the IODH to determine or may determine itself whether the identified I/O user devices 130 are usable individually or combinable to satisfy the UI capabilities specified by the incoming communication session. The user terminal emulation application 110 and/or the IODH may receive an ACK or NACK back on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use. In case of NACK, the user terminal emulation application 110 and/or the IODH can take different actions to setup a reduced UI capability communication service with the user depending on user settings, e.g. only allow sound-based communications instead of a combination of sound and video responsive to when no display device is presently available for use. An example of no display device being available may occur when the only display device that is proximately located to the user is presently being used by another user to receive information from another user terminal emulation application during an ongoing communication service or when no display device is proximately located to the user.

Further operations by UserTags, I/O user devices, and the user terminal emulation server are described in accordance with this example use case. A UserTag enters a room and signals its presence to any proximately located and capable I/O user device in the room using a discovery beacon signal. Alternatively, one or more of the I/O user devices determines presence of the UserTag by polling, such as by periodically transmitting discover beacon signals that trigger responsive signaling by the UserTag. The I/O user devices that receive signaling indicated presence of the UserTag report to the IODH along with a network address of the I/O user device (e.g., IP address, port number, MAC address, FQDN, etc.). The IODH may be executed by the user terminal emulation server as part of the user terminal emulation application, by the I/O user devices, and/or by another computing node of the system. The user terminal emulation application corresponding to the specific user (i.e., the UserTag) is updated with respect to the detected user's presence. The IODH may operate to receive the notifications from the I/O user devices proximately located to the UserTag. Further UI capability discovery (synchronization) communications are performed between the user terminal emulation server and the I/O user devices. The I/O user devices are associated to the user in the database, along with associated indications subscriptions, combinable UI capabilities provided by the set of I/O user devices which are proximately located to the UserTag. One or more of the I/O user devices may be selected for default call reception ACK/NACK. The user via the UserTag is now known to be reachable within the system through an identified set of I/O user devices with identified UI capabilities (e.g., speakers yes/no, display yes/no, microphone yes/no, keyboard yes/ no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

An incoming session (e.g., video call) from a requesting user terminal which is directed to the user (UserTag) arrives at the user terminal emulation server for the user carrying the UserTag. The individual or combinable UI capabilities of the available I/O user devices is compared to the UI requirements of the incoming session. When the UI requirements of the incoming session are not satisfied by the UI capabilities of the I/O user devices, the user terminal emulation server may renegotiate the required UI capabilities (e.g., QoS) of the incoming session. In contrast, when the UI requirements of the incoming session are satisfied the user terminal emulation server prompts, via one or more of the available I/O user devices (e.g., a pre-selected answer device), the user carrying the UserTag to provide a session request answer (ACK/NACK). The user responds through the pre-selected answer device to accept (ACK) or reject (NACK) the incoming session, to provide signaling to the user terminal emulation server. When an ACK is received, operations route an audio stream from the requesting user terminal to one of the I/O user devices in the set that has a speaker capability via one or more sessions, and routes a video stream from the requesting user terminal to another one of the I/O user devices in the set that has a display capability via one or more sessions. A data stream that is received from one of I/O user devices in the set through a one or more sessions is routed toward the requesting user terminal. When two or more data streams are received through one or more sessions from the I/O user devices, they can be combined into a combined data stream that is routed toward the requesting user terminal.

The user terminal emulation server may perform operations to continuously monitor presence of the I/O user devices to determine when one or more of I/O user devices is no longer proximately located to the user such that it can no longer be included as part of the combined UI be provided during the ongoing communication session. The user terminal emulation server may substitute the UI capability of another I/O user device to the set being used by the user for the ongoing communication session responsive to a previous member of the set no longer having required presence.

Use Case 2, Outgoing Call

This use case involves a user, with a UserTag, being proximately located to I/O user devices 130 having different UI capabilities when an outgoing call (communication session) is received by the user terminal emulation server. The I/O user devices 130 are associated to the identified user via the user terminal emulation server 100 which handles all communications sessions for the user while the associated I/O user devices 130 are managed by an IODH.

A user terminal emulation application 110 may be instantiated or otherwise activated responsive by an outgoing call being requested by a user carrying the UserTag. The user may initiate an outgoing call through a touchscreen, voice command sensed by a microphone, performing a defined gesture observable by a camera, and/or other input provided to one of the proximately located I/O user devices.

The user terminal emulation application 110 can identify subscriptions associated with the UserTag and preferred methods of communication (e.g., audio not video, audio and video, etc.) that have been specified by the user, and determines the UI capabilities of the I/O user devices that will be needed to satisfy the UI capabilities which may be specified for the outgoing call. The user terminal emulation application 110 may ask the IODH to identify which I/O user devices 130 are proximately located to the UserTag, and may further ask the IODH to determine or may determine itself whether the identified I/O user devices 130 are individually useable or combinable to satisfy the UI capabilities specified by the outgoing call. The user terminal emulation application 110 and/or the IODH may receive an ACK or NACK back on whether one or a set of I/O user devices 130 can be used to provide the communication service. If ACK, then the IODH also sets the state of the one or more I/O user devices 130 in the set to in-use to avoid another user terminal emulation application 110 attempting to utilize the same I/O user device(s) 130 as which are presently in use. In case of NACK, the user terminal emulation application 110 and/or the IODH can take different actions to setup a reduced UI capability communication service with the user depending on user settings, e.g. only allow sound instead of the preferred sound and video responsive to when no display device is presently available for use (e.g., when presently used by another user terminal emulation application 110 or when none is proximately located to the UserTag).

Example operations for an outgoing call and related data flows between UserTags, I/O user devices, and the user terminal emulation server are now described in the context of this use case. A UserTag enters a room and signals its presence to any proximately located and capable I/O user device in the room using a discovery beacon signal. Alternatively, one or more of the I/O user devices determines presence of the UserTag by polling, such as by periodically transmitting discover beacon signals that trigger responsive signaling by the UserTag. The I/O user devices that receive signaling indicated presence of the UserTag report to the IODH along with a network address of the I/O user device (e.g., IP address, port number, MAC address, FQDN, etc.). The IODH may be executed by the user terminal emulation server as part of the user terminal emulation application, by the I/O user devices, and/or by another computing node of the system. The user terminal emulation application corresponding to the specific user (i.e., the UserTag) is updated with respect to the detected user's presence.

The IODH may operate to receive the notifications from the I/O user devices proximately located to the UserTag. Further UI capability discovery (synchronization) communications are performed between the user terminal emulation server and the I/O user devices. The I/O user devices are associated to the user in the database, along with associated indicated service subscriptions and combinable UI capabilities provided by the set of I/O user devices which are proximately located to the UserTag. One or more of the I/O user devices may be selected for default call reception ACK/NACK. The user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

A user carrying the UserTag uses the UI of one of the I/O user devices to trigger an outgoing call (e.g., video call), which triggers signaling of the outgoing call to the user terminal emulation server. The IODH and/or the user terminal emulation application queries the user (e.g., displays a message, generates a sound, etc.) through one of the I/O user devices proximately located to the user to request the user to select among available types of communication methods that can be presently used for the outgoing call. One of the I/O user devices provides responsive signaling to the IODH indicating the user's selected type of communication method for the outgoing call. The user terminal emulation server communicates an outgoing session stream request to the network entity 150, where the request may include an identifier of the calling user, identifier of the user terminal of the called user, and a quality of service for the communication session. The user terminal emulation server receives a communication session acceptance (ACK) or denial (NACK) from the network entity 150. When the communication session is denied, the user terminal emulation server may attempt to renegotiate the requested communication session such as at a lower quality of service.

When the communication session is accepted (ACK), for each data type that is received as communication traffic from the requested user terminal, the user terminal emulation server selects one of the I/O user devices from among the set of I/O user devices based on matching characteristics of the data type to the UI capabilities identified by the database for the one of the I/O user devices, and then routes the data of the data type toward the network address of the selected one of the I/O user devices. The I/O user devices transmit data streams through one or more sessions to the user terminal emulation server, which may combine the data streams into a combined data stream that is routed toward the called user terminals via the network entity 150.

The user terminal emulation server may continuously monitor presence of the I/O user devices to determine when one or more of I/O user devices is no longer proximately located to the user such that it can no longer be included as part of the combined UI be provided during the ongoing communication session. The user terminal emulation server may substitute the UI capability of another I/O user device to the set being used by the user for the ongoing communication session responsive to a previous member of the set no longer having required presence.

Security Issues

It can be desirable in some system to provide operation for a virtual instance, e.g., virtual terminal emulation application 110, in the cloud, e.g., user terminal emulation server 100, to dynamically secure use of physical resources using authentication and key establishment procedures.

Some embodiments are directed to using a trusted party (function) to enable secure access and communications between a cloud service, e.g., user terminal emulation server 100 (also "Cloudphone") and I/O user device(s) 130. Some embodiments are directed to extending existing authentication functions to establish a secure association among various elements of the systems described regarding FIGS. 1-3 and, in particular, between the user terminal emulation server 100 and the I/O user device(s) 130 which are proximately located to a user.

In some embodiments, the user, who has been registered and authenticated to a cloud service, carries a user tag which has been associated (e.g., by a user identity) to the user terminal emulation server 100, e.g., "Cloudphone", such in the database 120. As explained above, there can be numerous I/O user devices 130 that are associated and registered to a lookup service, e.g., IODH 212.

When a user enters the close proximity of at least one I/O user device 130, operations are performed based on Extensible Authentication Protocol (EAP), Authentication and Key Management for Applications (AKMA), or another security function to establish a secure association between the user terminal emulation server 100 and the I/O user device(s) 130 proximately located to the user. The secure association enables the user terminal emulation server 100 to utilize the UI capabilities of those I/O user device(s) 130 to obtain a communication service.

In some example scenarios, the user tag (also) restrained device, is transported by a user to identify the user and can be capable of short-range radio signaling, e.g., near-field communication (NFC), Bluetooth, etc. The user tag is registered and authenticated to the I/O user device(s) 130. At least one I/O user device 130 has a local service providing certain UI capabilities which can be registered with the user terminal emulation server 100\for inclusion in a lookup service provided through the database 120.

Although some embodiments are described in the context of the user terminal emulation server 100 being a cloud phone, these and other embodiments are not limited thereto. Operations disclosed herein can be used to enable an authenticated user to securely couple physical resources, residing on separate private networks, to a cloud-based service. The cloud-based service may be a phone service, video conference service, streaming media service, video on-demand service, audio on-demand service, web service, digital assistant service, service technician service and/or any other service which may operate to communicatively connect to physical resources in the proximity of a user.

Various embodiments are now separately explained in the context EAP-based authentication operations and AKMA-based authentication operations, although the operations may be used with any security function operations which can facilitate secure access. FIG. 6 illustrates a flowchart of operations which may be performed by the user terminal emulation server 100 for providing a communication service through I/O user devices 130. The user terminal emulation server 100 includes at least one processor 1200 (FIG. 12) and at least one memory 1220 (FIG. 12) storing program code that is executable by the at least one processor 1200 to perform operations. The operations establish 600 a secure channel connection with a first I/O user device 130 using a session identifier and an identifier associated with the first I/O user device to determine a first I/O user device specific key generated from a master key, the first I/O user device specific key and the session identifier being used for secure communication of messages with the first I/O user device. The operations receive 602 an indication of an I/O user interface capability of the first I/O user device 130 through the secure channel connection with the first I/O user device 130. The operations communicate 604 with the first I/O user device 130 to use the I/O user interface capability to provide at least part of the communication service for a user.

These and other related operations are first described in the EAP-based authentication context and then described in the AKMA-based authentication context.

EAP-Based Authentication

EAP is an authentication framework which supports multiple authentication approaches. EAP typically runs directly over data link layers such as Point-to-Point Protocol (PPP) or IEEE 802, without requiring IP. EAP provides its own support for duplicate elimination and retransmission but is reliant on lower layer ordering guarantees. Fragmentation is not supported within EAP itself; however, individual EAP methods may support fragmentation.

EAP is a two-party protocol spoken between the EAP peer and server. Within EAP, keying material is generated by EAP authentication algorithms, known as "methods". Part of this keying material can be used by EAP methods themselves, and part of this material can be exported. In addition to the export of keying material, EAP methods can also export associated parameters such as authenticated peer and server identities and a unique EAP conversation identifier, and can import and export lower-layer parameters known as "channel binding parameters", or simply "channel bindings".

From RFC 5247: "EAP methods supporting key derivation and mutual authentication SHOULD export a method-specific EAP conversation identifier known as the Session-Id . . . ". Exporting can entail providing the exported information to the EAP authenticator.

An example flow of an EAP exchange for access authentication (802.1x used for WLAN/LAN), can include the device attaching to an AP, e.g., authenticator point. This means an (e.g.) 802.11 association is established between device and AP. The AP requests the identity of the device with an EAP identity request message. The device replies with its identity in an EAP response message. The AP, which works as an Authenticator, forwards the identity in a RADIUS or DIAMETER access request message to the authentication server.

The authentication server replies with a challenge for the device and indicating the EAP method to be used. The AP forwards the request in an EAP request message to the device. The device responds to the EAP message with an EAP response message. The AP forwards the response in a RADIUS or DIAMETER message to the authentication server. EAP messages are exchanged between the device and the authentication server until the authentication server has authenticated the device using the chosen method. The authentication server sends a RADIUS or DIAMETER access accept message, containing a pairwise master key (PMK) to the AP. The AP keeps the PMK and forwards the success in an EAP success message to the device. The device generates the corresponding PMK. The device is authenticated and the AP and device can use the PMK to configure access security. EAP can also be run towards Authenticators other than WLAN APs, and the Authenticator can be co-located with/part of the Authentication server.

Figure 4:
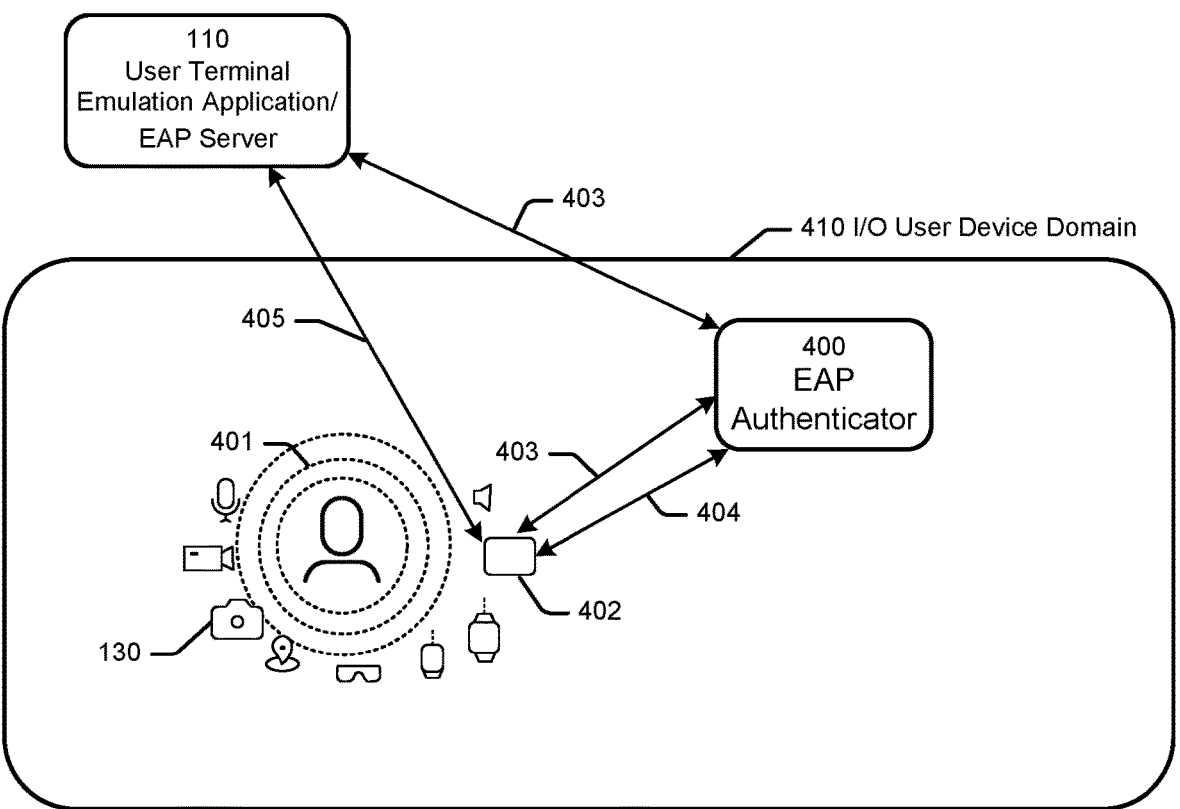
FIGS. 4 and 5 illustrate combined flowcharts of operations and related data flows between a UserTag, I/O user devices, an Extensible Authentication Protocol (EAP) authenticator, and a user terminal emulation server which may include an EAP server in accordance with some embodiments of the present disclosure.
Figure 5:
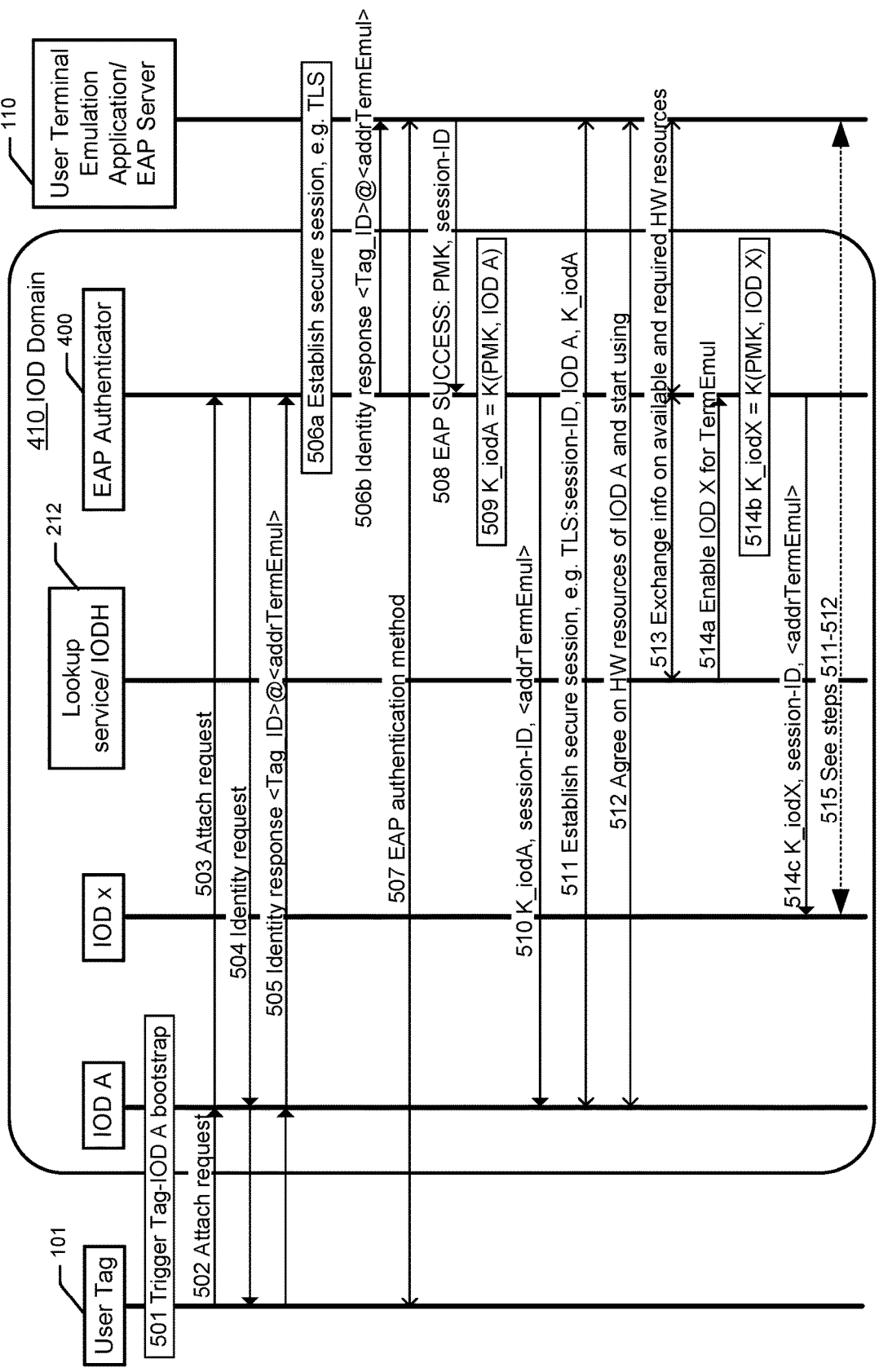

EAP-based operations between a user tag 110 and the user terminal emulation server 110, which can operate an EAP server (function), are now described with reference to FIGS. 4-8. FIGS. 4 and 5 illustrate combined flowcharts of operations and related data flows between the UserTag 110, elements of an IOD domain 410 (e.g., I/O user devices (IOD A . . . IOD x), a lookup service/IODH 212, an Extensible Authentication Protocol (EAP) authenticator 400)), and the user terminal emulation server 110 which may include an EAP server in accordance with some embodiments of the present disclosure. FIGS. 6-8 illustrate flowcharts of operations that may be performed by the user terminal emulation server 110 in accordance with some embodiments of the present disclosure.

Referring to FIGS. 4-8, an assumption in the EAP-based approach is that the user tag 101 is transported with the user and can be configured to operate as an EAP client. The user tag 101 therefore has at least limited communication and computational capabilities. An example user tag 101 can be a smart card with NFC or other short range communication such as capacitive communication coupling, or can be an electronic device with Bluetooth communication capabilities. The I/O user devices (IOD A . . . IOD x) are registered with their (local) IODH 212, which functions as a lookup service for I/O user devices (IOD A . . . IOD x) in the local IOD domain 410, i.e., the IODH 212 has information characterizing the I/O user devices (IOD A . . . IOD x) which may include an identifier, authentication credentials (e.g. public key of I/O user devices (IOD A . . . IOD x), location of I/O user devices (IOD A . . . IOD x) geographic coordinates, room numbers, floor numbers, etc., defining type information, defining UI capabilities, etc. In some embodiments, the user terminal emulation application 110 may be executed within the IOD Domain 410, such as with the EAP Authenticator 400 and/or the IODH 212. Executing the user terminal emulation application on the same computing node or on a locally networked node as the EAP authenticator and/or IODH can simplify and reduce system resources consumed to exchange information and other communications therebetween.

Which users and/or user terminal emulation applications are allowed to interact with the I/O user devices (IOD A . . . IOD x) in the IOD domain 410 can be determined based on access control policies which can reside in the IODH 212 and may vary depending on use case scenario, e.g. semi-public domain, such as a hotel vs. private domain such as an enterprise office complex.

In the scenario of FIG. 5, a user who is transporting a user tag 101, e.g., dongle, wants to utilize a proximately located I/O user device (IOD A). The user may trigger the I/O user device (IOD A), by pushing a button on the user tag 101, triggering a command responsive to the user tag seeing a SSID or BT address of the I/O user device (IOD A), and/or the I/O user device (IOD A). The user tag may be a NFC powered device or may be a mobile phone, tablet computer, etc. For example, the user may activate or initiate attention from the I/O user device (IOD A) using the user tag over NFC (i.e. very close proximity), and/or by the user pushing a button on the I/O user device to initialize a bootstrapping process 501.

The user tag sends 502, via the I/O user device (target), an attach request to the system where the I/O user device is connected. The attach request is forwarded 503 by the I/O user device to the EAP Authenticator 400 in the system. The EAP authenticator 400 may be a local process in the I/O user device (IOD A) or in the IODH 212 of the user terminal emulation server 100, or may reside as a separate entity in the IOD domain 410. The attach request may therefore be processed by the I/O user device itself, i.e. where multiple EAP Authenticators are present in the system, be processed by the IODH 212, or be processed by the EAP authenticator 400.

The EAP authenticator 400 responds 504 with an EAP identity request, which is communicated back to the user tag 101.

The user tag 101 responds 505 with an EAP response, which carries the identity of the user tag 101. The identity identifies the user tag 101 (e.g., holder of user tag, such as the user) and points to the user terminal emulation application 110 associated with the user tag 10. The identity may be <hash(user_pub_key)>@<user_terminal emulation application_address>. The hash of the public key provides a more compact identity of the public key of the user tag 101, and may be included with a network address of the user terminal emulation application 110. As explained above, the user terminal emulation application 110 may provide a communication service function corresponding to, for example, an over-the-top Voice Over Internet Protocol (VoIP) service, Netflix service, Facebook service, Microsoft Teams meeting service, Internet browser service, a cellular communication service, etc.

When the user tag 101 has been issued to the user, it may have also been associated with the corresponding user terminal emulation application 110. This means that the user tag 101, in addition to its own credentials (e.g. public key pair), can be configured to have reachability information of the user terminal emulation application 110, e.g., a Fully Qualified Domain Name (FQDN), as well as credentials for authentication of the user terminal emulation application 110 (e.g., public key of user terminal emulation application 110). Likewise, the user terminal emulation application 110 may have been configured with the credentials of the user tag 101 (e.g. public key of user tag 101). This means that the user terminal emulation application 110 knows that the user tag 101 is an entity that is authorized to request data streams and services from the user terminal emulation application 110.

The EAP authenticator 400 identifies 506 the user terminal emulation application 110 based on the realm part of the identifier and forwards the request to the user terminal emulation application 110, which is here acting as the EAP server.

The EAP authenticator 400 first establishes a secure connection between itself and the EAP server/user terminal emulation application 110. The EAP messages are passed over that secure channel between authenticator and EAP server/user terminal emulation application 110. The secure connection may be a Transport Layer Security (TLS) session. The EAP Authenticator knows it needs to talk with the EAP server based on the identity (realm part of identity) received in EAP Identity Response. It also knows it needs to have a secure channel with the EAP server. Thus, if there is not an existing secure session (typically TLS), the EAP Authenticator creates the secure session and then forwards the Identity response to the EAP server. The communication between the EAP Authenticator and the EAP Server function of the user terminal emulation application 110, while using EAP messages, may be carried by DIAMETER or RADIUS protocol.

The user terminal emulation application 110/EAP server and the user tag 101 will perform an EAP exchange 507 to authenticate the user tag 101 to the user terminal emulation application 110. The user terminal emulation application 110 may also be authenticated to the user tag 101. The authentication may require multiple messages to be exchanged between the user tag 101 and the user terminal emulation application 110 via the EAP authenticator 400.

Once the user tag 101 and possibly also the user terminal emulation application 110 is/are successfully authenticated, the user terminal emulation application 110/EAP server can send 508 a final EAP SUCCESS message to the EAP authenticator 400. The EAP SUCCESS message also carries the master key, e.g., pairwise master key (PMK), and the session-ID. The PMK key is the master key for the session-ID, the PMK key can be used to derive more keys for I/O user devices, e.g., IOD X, added to this session.

In an optional operation, the user tag 101 at this stage may derive the master key, e.g., PMK key, but it will not (necessarily) be used by the user tag 101. The master key can be used if the user wants to authorize additional I/O user devices, e.g., IOD X, assuming the user is more in control of which I/O user devices are added to the session by having to actively (possibly even physically) add more I/O user devices to the user terminal emulation application 110.

The authenticator generates 509 an I/O user device specific key K_iodA from the received keying material to be used for streaming data between user terminal emulation application 110 and the target I/O user device IOD A. Generating the I/O user device specific key K_iodA may include using the received keying material as is, or may include performing a computational operation on the received key material such as by hashing a concatenation of the keying material and the identifier of the target I/O user device IOD A and/or using another key derivation function (KDF) based on PMK and I/O user device specific information.

The EAP authenticator 400 provides 510 the I/O user device specific key K_iodA to the I/O user device IOD A, together with the session-ID exported by the EAP server/user terminal emulation application 110 and the address (e.g. FQDN) of the user terminal emulation application 110.

The I/O user device IOD A can use the received data to establish 511 a secure channel (e.g. TLS) between itself and the user terminal emulation application 110. It is noted that in some embodiments, to establish the secure channel between I/O user device IOD A and the user terminal emulation application 110 there needs to be a shared secret (which is the first I/O user device specific key K_iodA), an identifier for who is connecting to the user terminal emulation application 110 (IOD A) and that is used to derive I/O user device specific key, and an identifier (session-ID) that the user terminal emulation application 110 can use to lookup the context from where it can derive the corresponding K_iodA.

If the EAP Authenticator 400 is part of I/O user device IOD A, then the I/O user device could re-use the TLS session established in operation 506. However, a more scalable solution is enabled by using a uniform operation for all I/O user devices connecting to the user terminal emulation application 110 so as to not have special cases in an implementation.

In operation 511, the I/O user device IOD A can use the session-ID to indicate to the user terminal emulation application 110 the session/keying material/authentication context to which the connection request relates.

The user terminal emulation application 110 locates context and associate keying material based on received session-ID. As background, the IOD A is to connect with user terminal emulation application 110 using a secure channel so the user terminal emulation application 110 can stream or receive data from the IOD A, such that the IOD A needs to have keying material which it can use to establish a secure connection and the user terminal emulation application 110 needs to verify that the IOD A is authorized to send data. So the session ID that was sent in operation 508 is what the IOD A can send to the user terminal emulation application 110 so it knows the request relates to the authentication session that was setup for the session ID, and then locates its copy of the PMK key and any other keys negotiated during the authentication.

The I/O user device uses its own identifier (e.g. IOD A) as a kind of username. The IOD A thereby tells the user terminal emulation application 110 who it is. The EAP authenticator 400 has derived an IOD A specific key based on the PMK key, e.g., by concatenating the IOD A ID and the PMK key and then hashing the concatenated string, and may truncate the hash value to a defined length. The user terminal emulation application 110 needs to know the ID for the IOD A so it can derive the same IOD A specific key provided to IOD A in step 10.

The user terminal emulation application 110 uses the I/O user device identifier to derive IOD A specific key (K_iodA). The IOD A uses the received key K_iodA as the password/authentication credential to authenticate to the user terminal emulation application 110. In this operation the I/O user device IOD A and the user terminal emulation application 110 share the same IOD A specific key which is used as a shared secret that the user terminal emulation application 110 and I/O user device IOD A use to authenticate each other and establish a secure channel therebetween. The user terminal emulation application 110 verifies, via PSK-based authentication, that the I/O user device indeed possesses a valid session key (K_iodA) and is thus authorized to connect to the user terminal emulation application 110 and exchange data with it. A secure channel is established between the I/O user device IOD A and the user terminal emulation application 110.

The I/O user device IOD A, after successful authentication, can indicate 512 its UI capabilities (e.g., display, speaker, microphone, etc.) to the user terminal emulation application 110, which based on the UI capabilities, can enable data streaming to and/or from the I/O user device IOD A.

The user may have defined policies to the user terminal emulation application 110 regarding what operations can be enabled automatically (e.g., streaming video to a display device for the communication service) and what operations requires explicit user consent before performing (e.g., to enable microphone use for the communication service)

In a parallel optional operations, the user terminal emulation application 110 may operate to interact 513 with the IODH 212 regarding other I/O user devices in the vicinity of the user which have UI capabilities that can be used to provide the communication service to the user. These operations can provide the user terminal emulation application 110 information about what UI and/or I/O capabilities could be available to the user for the communication service. Whether the user terminal emulation application 110 may operate to interact 513 with the IODH 212 regarding other I/O user devices may depend on which service and/or application is running in the user terminal emulation application 110.

This communication may be performed via an entity of the I/O domain 410 acting as an EAP authenticator 400 towards the user terminal emulation application 110, and thereby the already established secure channel could be re-used. Alternatively, the EAP authenticator 400 may generate an IODH 212 specific session key (similar to what was performed for IOD A) and provide IODH 212 with all relevant info (e.g., K_iodh, session-ID, user terminal emulation application 110 FQDN) for securely communicating with the user terminal emulation application 110.

The IODH 212 may itself be the EAP authenticator 400, in which case much of the "communication" between authenticator and IODH 212 is simplified, such as where the PMK is used directly by the IODH 212 to securely communicate with user terminal emulation application 110, or the already established secure session is re-used.

The communication may include the IODH 212 telling the user terminal emulation application 110 about which I/O user devices are available to the user, and may include the user terminal emulation application 110 requesting certain HW resources from the IODH 212.

When the IODH 212 concludes, or the user terminal emulation application 110 requests, that a certain other I/O user device (IOD X) should join the session established between the user and the IOD domain 410, the IODH 212 can request 514a the EAP authenticator 400 to generate credentials for the other I/O user device (IOD X), (e.g., K_iodx, session-ID, user terminal emulation application 110 FQDN) and provide those credentials to the other I/O user device (IOD X).

The IODH 212 may send 514a a request based on the user instructing the user terminal emulation application 110 (e.g. over connection with some already connected I/O user device) or based on local policy and/or configuration. The decision that a further I/O user device is required may be dependent upon: which application and/or service the user activates; ongoing application and/or service; available devices and their respective UI capabilities; and/or a defined configuration by the user to always try to find an I/O user device which has certain UI capability(ies).

If the other I/O user device IOD X receives 514c a trigger (e.g., where the trigger is the credentials etc. needed to connect to user terminal emulation application 110) from the EAP authenticator 400, the other I/O user device IOD X performs similar operations to the I/O user device IOD A as described above in operations 511 to 512.

More General Operations With Respect to FIGS. 4-8

Embodiments are not limited to the particular operations illustrated in FIG. 5 and discussed above. For example, the user tag 101 can more generally include circuitry that is configured to send 502 to a first I/O user device 130 (which may corresponds to IOD A) an attach request, and receive 504 from the first I/O user device 130 an identity request by an authenticator 400. The user tag 101 then sends 505 to the I/O user device a response which contains an identifier of the user tag and an address of a user terminal emulation application 110 hosted by a user terminal emulation server 100. The user tag 101 then communicates 507 with the user terminal emulation application (110) to perform an exchange for mutual authentication and establish a master key used to generate one or more I/O user device specific keys.

The circuitry of the user tag 101 may be powered by NFC reader circuitry of the first I/O user device 130 to send 502 the attach request, to receive 504 the identity request, to send 505 the response, and to communicate 507 with the user terminal emulation application 110 to perform the exchange. The circuitry may be further configured to generate 505 the identifier of the user tag based on hashing a public key of the user tag.

The user terminal emulation server 100 is generally configured to provide a communication service through I/O user devices 130, and includes at least one processor 1200 (FIG. 12) and at least one memory 1220 (FIG. 12) storing program code that is executable by the at least one processor to perform operations. The operations include to establish 405 (FIG. 4), 511 (FIG. 5), 600 (FIG. 6), 907 (FIG. 9) a secure channel connection with a first I/O user device (130) using a session identifier and an identifier associated with the first I/O user device to determine a first I/O user device specific key generated from a master key, where the first I/O user device specific key and the session identifier being used for secure communication of messages with the first I/O user device. The first I/O user device specific key may be determined based on the I/O user device identifier, such as an I/O user device key (e.g., KDF (PMK, I/O user device ID), where KDF is a key derivation function). The operations receive 405, 512, 602, 907 an indication of an I/O user interface capability of the first I/O user device 130 through the secure channel connection with the first I/O user device 130. The operations communicate 405, 512, 604, 907 with the first I/O user device 130 to use the I/O user interface capability to provide at least part of the communication service for a user.

The operations by the user terminal emulation server 100 can further include to receive 506*b*, 702 an EAP response through a communication channel with the EAP authenticator 400, where the EAP response contains an identifier of a user tag 101. The operations communicate 507, 704 with the user tag 101 to perform an EAP exchange for authentication and establish the master key, and send 508, 706 an EAP success message to the EAP authenticator 400, where the EAP success message contains the master key and a session identifier associated with the master key. It is noted that the IOD A has communicated with the user terminal emulation application to authenticate with the IOD A specific key. Following the sending 508, 706 of the EAP success message to the EAP authenticator 400, the operations perform 708 the receiving 405, 512, 602 of the indication of the I/O user interface capability of the first I/O user device 130 and the communicating 405, 512, 604 with the first I/O user device 130 to use the I/O user interface capability to provide at least part of the communication service for the user.

The operations by the user terminal emulation server 100 can further include to store in a database 120 (FIG. 1) the identifier of the user tag allowed to access the communication service, a network address of the first I/O user device based on communications with the first I/O user device, the first I/O user device specific key, and the indication of the I/O user interface capability of the first I/O user device (130).

It is noted that initially the user terminal emulation server 100 (i.e., via the user terminal emulation application 110) stores the session identifier and the PMK. When an I/O user device connects to the user terminal emulation server 100, the I/O user device provides its identifier to the user terminal emulation server 100 as part of the connection establishment procedure. The user terminal emulation server 100 can now generate the I/O user device specific key. Using the I/O user device specific key, the user terminal emulation server 100 can authenticate the I/O user device, and after which can establish the secure channel between the two. The I/O user device has obtained the corresponding key from the EAP Authenticator 400 in IOD domain 410. The I/O user device can likewise optionally authenticate the user terminal emulation application 110 using the key (i.e. verify that the user terminal emulation application 110 belongs in the session as it possesses a key associated with it. The I/O user device specific key can be generated by the user terminal emulation application 110 only after the user terminal emulation application 110 has learnt the ID of the I/O user device specific key. In some embodiments, the user terminal emulation application 110 learns the I/O user device identifier when the I/O user device tries to connect to the user terminal emulation application 110.

In some embodiments, the order of events includes the I/O user device connects to the user terminal emulation application 110 (with own ID, session ID and the I/O user device specific key). The user terminal emulation application 110 identifies session context based on session ID. The user terminal emulation application 110 derives the I/O user device specific key (and maybe stores in in the database). The user terminal emulation application 110 and the I/O user device authenticate based on the I/O user device specific key. A secure channel can then be setup based on the I/O user device specific key.

The operations to establish 405, 511, 600 the secure channel connection with the first I/O user device 130 using the session identifier and the identifier associated with the first I/O user device to determine the first I/O user device specific key generated from the master key, can include to receive a secure channel connection request which includes the identifier of the first I/O user device (130) and the session identifier, and initiate the determination of the first I/O user device specific key based on the master key. The operations store the first I/O user device specific key in the database with an association to the session identifier. The operations obtain the first I/O user device specific key from the database using the session identifier, authenticate the first I/O user device based on the first I/O user device specific key, and setup the secure channel connection with the first I/O user device (130) responsive to authentication of the first I/O user device.

The operations by the user terminal emulation server 100 can further include to obtain 513, 800 an identifier of a second I/O user device 130, e.g., IOD X, that is proximately located to the first I/O user device 130 and has an I/O user interface capability that satisfies a rule for being combinable with the I/O user interface capability of the first I/O user device 130 to provide the communication service. The operations establish 515, 802 the secure channel connection with the second I/O user device 130 based on the master key being used to generate a second I/O user device specific key using the identifier for the second I/O user device 130. For example, in one embodiment, the I/O user device specific key is derived by first having the user terminal emulation server 100 authenticate, either indirectly or directly, with a 3GPP key agreement function, and afterwards have the user terminal emulation server 100 derive an I/O user device specific key based on the I/O user device identifier (e.g., FQDN) and key material derived when authenticating with the 3GPP key agreement function. The I/O user device 130 gets its own copy of the I/O user device specific key by communicating with the 3GPP key agreement function, which uses the I/O user device identifier to derive the I/O user device specific key which it provides to the I/O user device 130. The operations communicate 515, 804 with the second I/O user device 130 to use the I/O user interface capability of the second I/O user device 130 to provide another part of the communication service for the user.

Corresponding operations by the EAP authenticator 400 are now described. The EAP authenticator 400 can include at least one processor 1300 (FIG. 13), at least one memory 1320 (FIG. 13) storing program code that is executable by the at least one processor to perform operations. The operations include to receive 505, from the first I/O user device 130, an EAP response which contains the identifier of the user tag containing an address of a user terminal emulation application 110 hosted by a user terminal emulation server 100. The operations establish 506*a* a communication channel with the user terminal emulation application 110 based on the address in the user tag of the user terminal emulation application 110, and send 506*b* at least one EAP message based on the EAP response through the communication channel with the user terminal emulation application 110. The EAP authenticator 400 also receives EAP messages from the user terminal emulation application 110. In general, the EAP Authenticator 400 passes EAP messages between the user tag 101 and the user terminal emulation application 110. The operations receive 508 an EAP success message from the user terminal emulation application 110, where the EAP success message contains a master key and a session identifier, and generate 509, based on the master key, a first I/O user device specific key. The operations then send 510 to the first I/O user device 130 the first I/O user device specific key, the session identifier, and the address for the user terminal emulation application 110.

The at least one EAP message may be sent 506*b* through the secure channel connection to the user terminal emulation application 110 using DIAMETER protocol or RADIUS protocol. The EAP authenticator 400 exchanges EAP messages between the user tag 101 and the user terminal emulation application 110.

The EAP authenticator 400 may generate 509 the first I/O user device specific key based on a key derivation function performed on the master key and an identifier of the first I/O user device 130.

The EAP authenticator 400 may obtain 513 an identifier of a second I/O user device 130 that is proximately located to the first I/O user device 130 and has an I/O user interface capability that satisfies a rule for being combinable with the I/O user interface capability of the first I/O user device (130) to provide a communication service, and generate 514*b*, based on the master key, a second I/O user device specific key. The EAP authenticator 400 may can then send 510 to the second I/O user device 130, the second I/O user device specific key, the session identifier, and the address for the user terminal emulation application 110.

Corresponding operations by the first I/O user device 130 are now described. The first I/O user device 130 can include at least one processor 1100 (FIG. 11), and\at least one memory 1110 (FIG. 11) storing program code that is executable by the at least one processor to perform operations. The operations include to receive 502 from a user tag an attach request, and forward 503 the attach request to an authenticator 400. The operations forward 504 to the user tag an identity request received from the authenticator 400, and forward 505 to the authenticator 400 a response received from the user tag, the response which contains an identifier of the user tag containing an address of a user terminal emulation application 110 hosted by a user terminal emulation server 100. The operations receive 510 from the authenticator 400 a message comprising a first I/O user device specific key for the first I/O user device 130, a session identifier, and the address for the user terminal emulation application 110. The operations establish 511 a secure channel connection with the user terminal emulation application 110 using the first I/O user device specific key and the session identifier received from the authenticator 400. The operations send 512 an indication of an I/O user interface capability of the first I/O user device to the user terminal emulation application 110 through the secure channel connection. The operations communicate 512 with the user terminal emulation server 100 to use the I/O user interface capability of the first I/O user device 130 to provide at least part of a communication service to a user.

The operation to establish 511 the secure channel connection with the user terminal emulation application 110 using the first I/O user device specific key and the session identifier received from the authenticator 400, may include sending the session identifier and an identifier of the first I/O user device to the user terminal emulation application 110 to indicate which I/O user device specific key is to be used to establish 511 the secure channel connection.

The first I/O user device 130 may include a near-field communication, NFC, reader circuit configured to power the user tag to send 502 the attach request.

Utilizing Authorization Tokens

In operations 508 above, when the user tag 101 has authenticated itself towards the user terminal emulation application 110 using EAP, the user tag 101 now also possesses the session keying material. Using this, the user tag 101 may generate authorization tokens for other IODs, e.g., IOD X, that the user tag 101 wants to add to the currently ongoing session.

These operations may be an alternative to having the EAP Authenticator 400 or the IODH 212 delegate session keys to the I/O user devices. The token may, e.g., be a signed piece of data contain things such as the session ID (so that the user terminal emulation application 110 can map the token to the session), the newly selected I/O user devices identity (so that user terminal emulation application 110 can verify that the correct I/O user device is using the token) and possible a lifetime of the token.

The user tag 101 may provide such token (and a pointer to the user terminal emulation application 110) to selected I/O user devices, which could then connect to the user terminal emulation application 110 and present the token as proof of authorization by the user tag 101. The communication between user tag 101 and newly selected I/O user device may be similar to the initial registration to the IOD Domain 410 as described above starting with operation 501; the user tag 101 indicates it wants to connect the I/O user device IOD X to the user terminal emulation application 110, but in a way that the I/O user device IOD X understands to reply with its identity.

As an example, when providing the user tag's identity in the EAP identity reply message, the user tag 101 may use the session ID as an identifier (or part of the identifier). The I/O user device IOD X itself, or the EAP Authenticator 400 may determine from the identifier a relation to an already ongoing session and which would result in providing the user tag 101 with the identity of the new I/O user device.

The identity of the I/O user device may be interpreted as an authentication challenge in an EAP method. The reply to the challenge may be the token generated by the user tag 101. The I/O user device IOD X may use the help of the EAP Authenticator 400 to verify that the token is valid (e.g., the EAP Authenticator 400 possesses the same keying material and can verify the signature), or may blindly trust the token and start using it towards the user terminal emulation application 110.

These operations provide the user tag 101 and/or the user more control with respect to which I/O user device(s) are connected to the session as the user needs to select the used I/O user device(s). For proper trust in the tag by the user terminal emulation application 110, the user tag 101 would also have a signature generated by the permanent credential of the user tag 101 towards the user terminal emulation application 110 (or non-exported keying material of the EAP exchange, i.e. keying material not shared with the EAP Authenticator 400), since the EAP generated session key is also known to the EAP Authenticator 400, which therefor could generate a valid looking token even without the knowledge of the user.

Public vs Private IOD Domains

The operations described above may be used in various scenarios such as in public locations (e.g. vacation resort/ hotel) or private locations (e.g. enterprise office/complex). For these different types of scenarios there are differences with respect to access control requirements, such as for a public location (typically) anyone should be able to connect their cloud service (e.g. user terminal emulation application 110) to a public I/O user device, while in a private setting only authorized services/users would typically be allowed. This could be, e.g., the employees of a company being allowed to connect their user terminal emulation application 110 to I/O user devices in the office building. Alternatively, a mixed model may be provided where certain I/O user devices are accessible to anyone, while some other I/O user devices are only accessible to a subset of users and/or user terminal emulation applications 110.

Controller Function

A controller function in the IOD Domain 410 may be responsible for verifying that the connecting user terminal emulation application 110 is authorized to connect to the specified I/O user device. This could be a separate entity or a function of the IODH 212, which knows about all the I/O user devices in the domain 410. Alternatively, the controller function may be a part of the EAP Authenticator 400 or an Authentication and Key Management for Applications (AKMA) server, respectively (which in turn may be part of IODH 212, or be separate entities/functions).

When a user terminal emulation applications 110 or user is being authenticated to an AKMA server or the EAP Authenticator 400, the I/O user device Domain controller (IDC) can operate to verify that the connecting identity (tag identity authenticated with EAP, user terminal emulation applications identity learnt during EAP while setting up secure channel to user terminal emulation applications 110, or user terminal emulation applications identity learnt during AKMA authentication) is authorized to access services in the IOD Domain 410, and the target I/O user device specifically. If there are access control policies which indicate that the user and/or user terminal emulation applications 110 is not allowed, the controller function can operate to terminate the authentication and may provide some error code indicating the user and/or service is not authorized.

3GPP Key Agreement Approach

Figure 9:
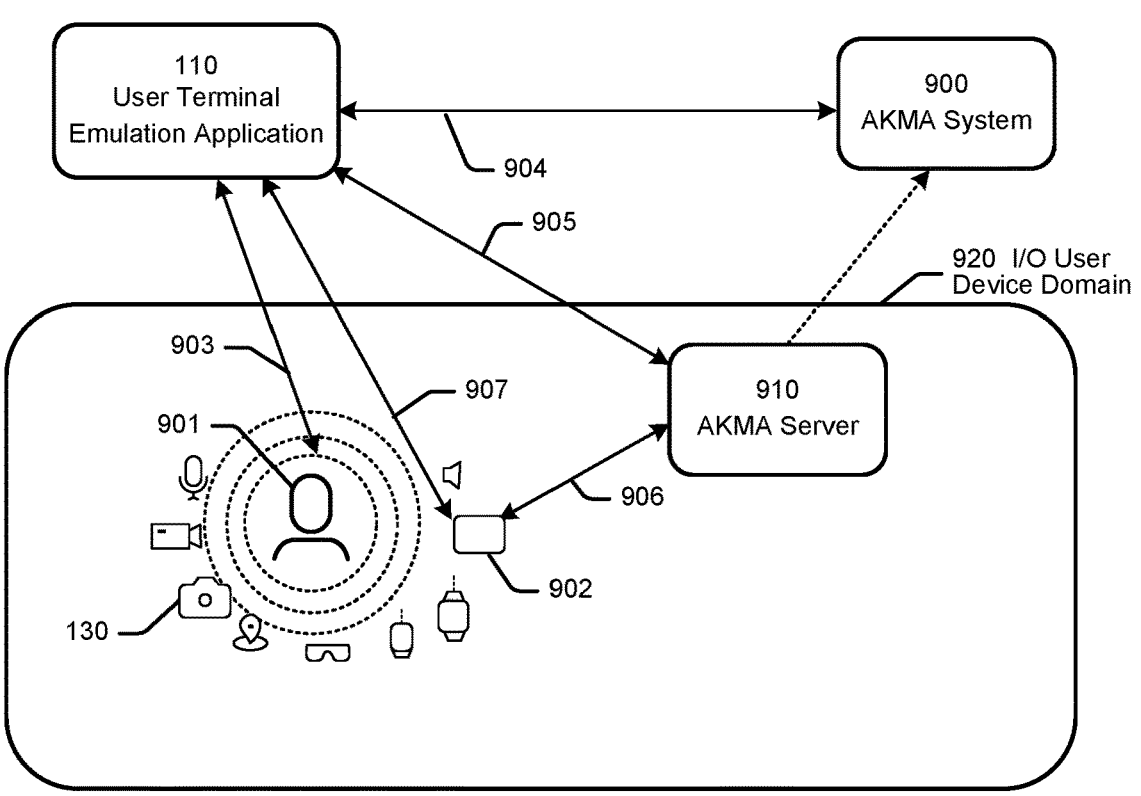
FIG. 9 illustrates a combined flowchart of operations and related data flows between a UserTag, I/O user devices, a 3GPP key agreement function system, and a user terminal emulation server in accordance with some embodiments of the present disclosure.
Figure 10:
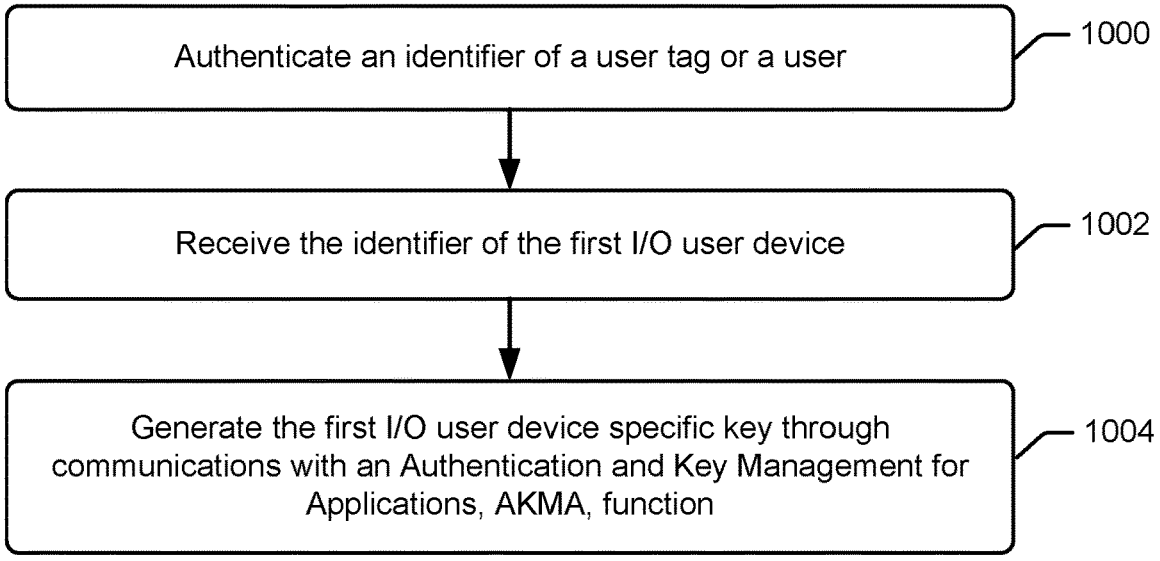
FIG. 10 illustrates a flowchart of operations that may be performed by a user terminal emulation server in accordance with some embodiments of the present disclosure.

A 3GPP key agreement function for providing a communication service through a user terminal emulation application to I/O user devices in an I/O user device domain 910 is now described. Various operations are described in the context of AKMA and GRA, but are not limited thereto. FIG. 9 illustrates a combined flowchart of operations and related data flows between a UserTag, I/O user devices, a 3GPP key agreement function system (which may be an AKMA system or Generic Bootstrapping Architecture system), and a user terminal emulation server 110 in accordance with some embodiments of the present disclosure. FIG. 10 illustrates a flowchart of operations that may be performed by the user terminal emulation server 110 in accordance with some embodiments.

Referring to FIGS. 9 and 10, a user 901 selects a target I/O user device 902 and obtains therefrom an I/O user device identifier. For example, the user may scan an I/O user device identifier, such as by scanning a QR code, reading an identifier from a sticker on the I/O user device and entering the identifier into the user's own input device, using NFC to read the identifier from the I/O user device, etc. The user tag and I/O user device may include circuitry configured to utilize one or more communication protocols to communicate information described herein The I/O user device identifier can include an identifier of the I/O user device (IOD_ID) and an IOD Domain identifier, e.g. screen123@myioddomain.com.

The user 901 connects 903 to and authenticates to user terminal emulation application 110 (own cloud based service). The I/O user device, or IOD Domain, may provide communication connectivity, e.g. over Bluetooth, WiFi, NFC, etc. or the user device and/or user tag may be configured with its own communication connectivity. Once the user terminal emulation application 110 has authenticated user/tag, the user 901 provides the obtained IOD ID to user terminal emulation application 110.

The user terminal emulation application 110 generates mobile subscription/SIM based credentials for use towards services by interacting 904 with the AKMA system 900 or a Generic Bootstrapping Architecture (GBA) function in the mobile operator. A result of the interacting 904 is that the user terminal emulation application 110 and the mobile operator, e.g., AKMA or GBA function, has a shared master AKMA secret key or shared master GBA secret key, and has an identifier for the context or key.

The user terminal emulation application 110 connects to the IOD Domain (e.g., AKMA Server) based on the I/O user device identifier (received in operation 903) realm part (e.g., myioddomain.com). The user terminal emulation application 110 derives an IOD Domain (e.g., AKMA Server 910) specific key from the AKMA or GBA master secret key. The user terminal emulation application 110 provides the AKMA or GBA context identifier to IOD Domain (e.g., AKMA Server 910). The IOD Domain (e.g., AKMA Server 910) uses the received AKMA or GBA context identifier to obtain IOD Domain specific AKMA or GBA key from the mobile operator AKMA or GBA function (e.g., AKMA Server 910), which may require pre-existing SLA/trust relationship between the IOD Domain and the mobile operator hosting the AKMA System. The user terminal emulation application 110 and the IOD Domain (e.g., AKMA Server 910) authenticate using the IOD Domain specific AKMA or GBA key, which may use a created secure session for further communication.

The user terminal emulation application 110 tells 905 the IOD Domain which I/O user device (e.g., screen 123) it wants to interact with, e.g., based on the I/O user device identifier received in operation 903. The user terminal emulation application 110 also provides a pointer to itself, e.g., IP address, FQDN, etc.

The IOD Domain 920 (e.g., AKMA Server 910) generates 906 an IOD specific AKMA or GBA session key from the IOD Domain specific AKMA or GBA key and the I/O user device identity, which may be similar to how in the EAP example above an IOD specific key is derived from EAP PMK and provides the IOD specific key to the I/O user device. The IOD Domain 920 (e.g., AKMA Server 910) may also provide a pointer to the user terminal emulation application 110, and an AKMA or GBA context identifier.

The I/O user device connects 907 to the user terminal emulation application 110 based on received info. The I/O user device indicates the AKMA or GBA context identifier to the user terminal emulation application 110. The user terminal emulation application 110 can locate the AKMA or GBA context (e.g., AKMA or GBA master key). The I/O user device indicates its identity to the user terminal emulation application 110. The user terminal emulation application 110 can use the I/O user device identity together with the IOD Domain specific AKMA or GBA key to derive IOD specific AKMA or GBA session key. The user terminal emulation application 110 and the I/O user device can mutually authenticate using the I/O user device specific AKMA or GBA session key. The user terminal emulation application 110 and the I/O user device can use key to further establish a secure channel between themselves for streaming data for the communication service.

The operations by the user terminal emulation server 100 may more generally include, with reference to FIGS. 9 and 10, to authenticate 903, 1000 an identifier of the user tag or a user, receive 903, 1002 the identifier of the first I/O user device. The operations generate 904, 905, 1004 the first I/O user device specific key through communications with a 3GPP key agreement function.

The key agreement function may include one of: an AKMA function; a GBA function; and a Battery Efficient Security for very low Throughput Machine Type Communication function.

The operation to generate 904, 905, 1004 the first I/O user device specific key through communication with the key agreement function, may include to generate the first I/O user device specific key based on processing the master key derived through the key agreement function.

The operations may further include to communicate with the 3GPP key agreement function, e.g., AKMA function, hosted in a mobile operator system to generate a shared secret between the user terminal emulation server 100 and the key agreement function.

Figure 11:
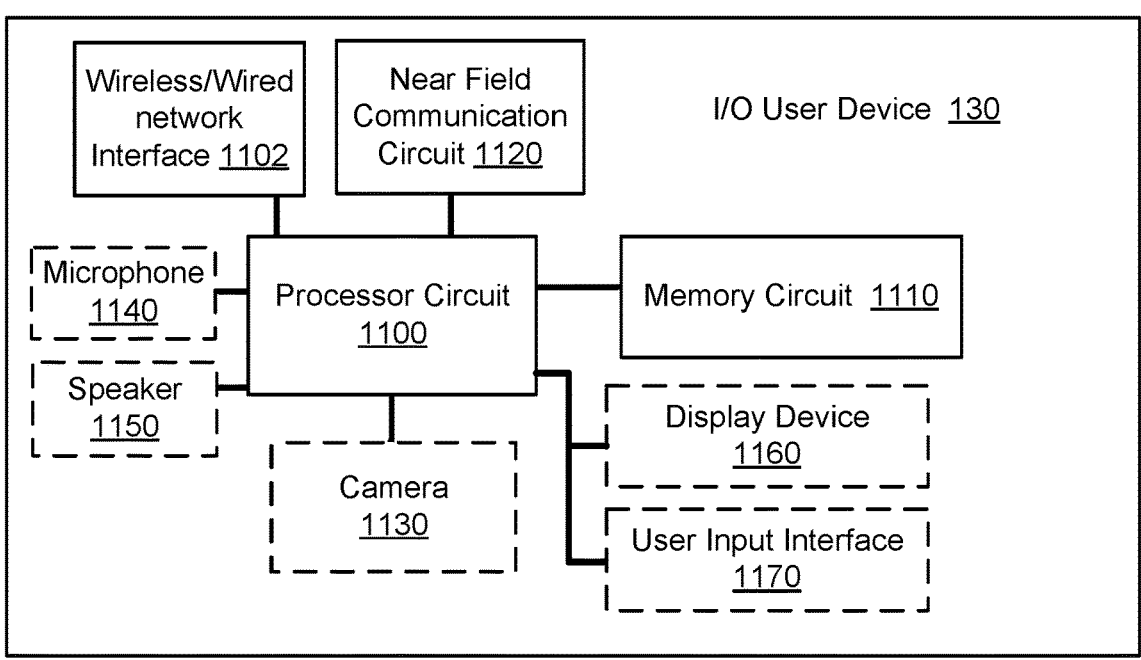
FIG. 11 illustrates a block diagram of hardware circuit components of an I/O user device which are configured to operate in accordance with some embodiments.

Example I/O User Device, User Terminal Emulation Server, and EAP Authenticator or AKMA Server FIG. 11 is a block diagram of hardware circuit components of an I/O user device 130 which are configured to operate in accordance with some embodiments. The I/O user device 130 can include a wired/wireless network interface circuit 1102, a near field communication circuit 1120, at least one processor circuit 1100 (processor), and at least one memory circuit 1110 (memory). The processor 1100 is connected to communicate with the other components. The memory 1110 stores program code (e.g., user terminal emulation application(s) 110) that is executed by the processor 1100 to perform operations disclosed herein. The processor 1100 may include one or more data processing circuits (e.g., microprocessor and/or digital signal processor), which may be collocated or distributed across one or more data networks. The processor 1100 is configured to execute the program code in the memory 1110, described below as a non-transitory computer readable medium, to perform some or all of the operations and methods for one or more of the embodiments disclosed herein for a mobile electronic device. The I/O user device 130 can include one or more UI component devices, including without limitation, a microphone 1140, a speaker 1150, a camera 1130, a display device 1160, and a user input interface 1170.

Figure 12:
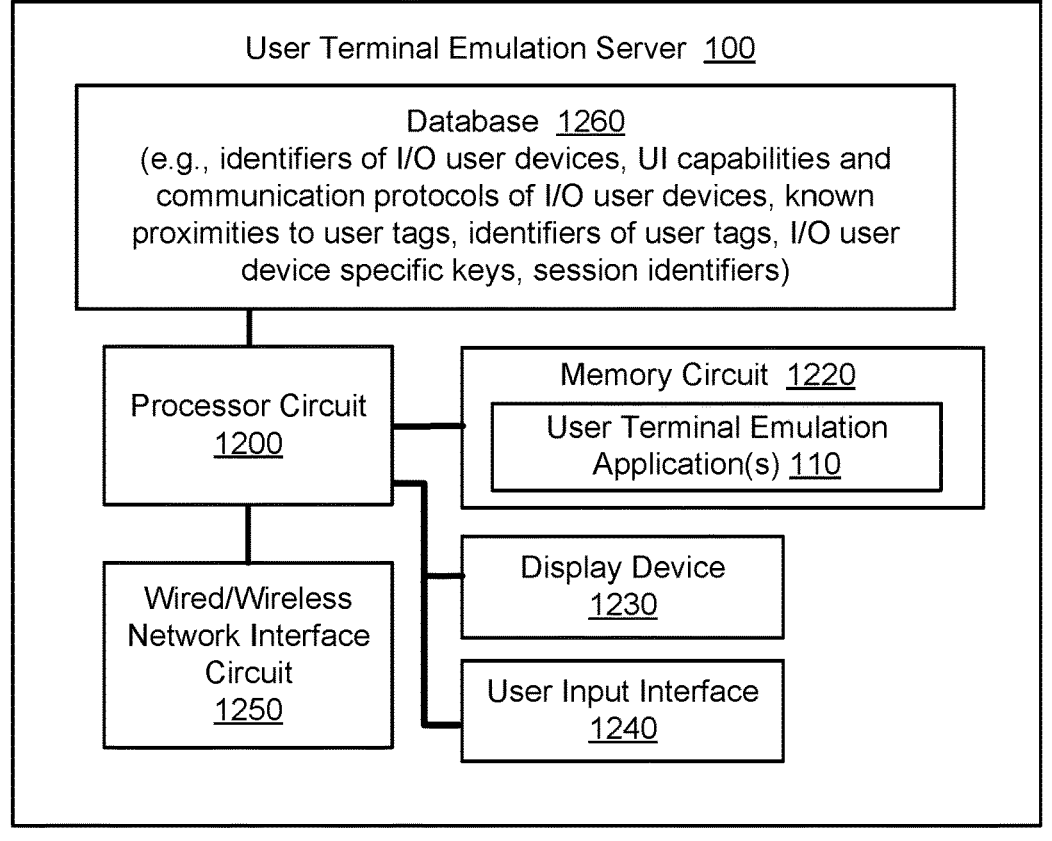
FIG. 12 illustrates a block diagram of hardware circuit components of a user terminal emulation server that are configured to operate in accordance with some embodiments of the present disclosure.

FIG. 12 is a block diagram of hardware circuit components of a user terminal emulation server 100 which are configured to operate in accordance with some embodiments. The user terminal emulation server 100 can include a wired/wireless network interface circuit 1250, a database 1260 (e.g., any one or more of a listing I/O user devices, UI capabilities of the I/O user devices, communication protocols used to communicate with the I/O user devices, known proximities to user identifiers, identifiers of user tags, I/O user device specific keys, session identifiers, etc.), a display device 1230, a user input interface 1240 (e.g., keyboard or touch sensitive display), at least one processor circuit 1200 (processor), and at least one memory circuit 1220 (memory). The processor 1200 is connected to communicate with the other components. The memory 1220 stores user terminal emulation application(s) 110 that is executed by the processor 1200 to perform operations disclosed herein. The processor 1200 may include one or more data processing circuits (e.g., microprocessor and/or digital signal processor), which may be collocated or distributed across one or more data networks. The processor 1200 is configured to execute computer program instructions in the memory 1220, described below as a non-transitory computer readable medium, to perform some or all of the operations and methods for one or more of the embodiments disclosed herein for a mobile electronic device.

Figure 13:
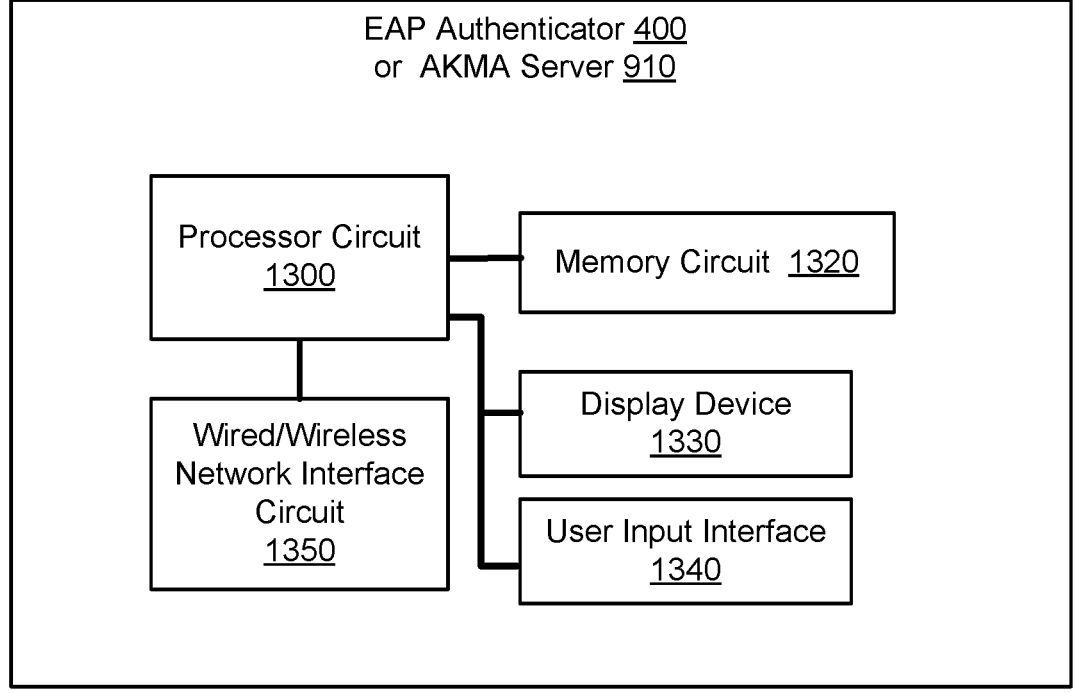
FIG. 13 illustrates a block diagram of hardware circuit components of an EAP authenticator or AKMA server that are configured to operate in accordance with some embodiments of the present disclosure.

FIG. 13 illustrates a block diagram of hardware circuit components of an EAP authenticator 400 or AKMA server 910 that are configured to operate in accordance with some embodiments of the present disclosure. The components can include a wired/wireless network interface circuit 1350, a display device 1330, a user input interface 1340 (e.g., keyboard or touch sensitive display), at least one processor circuit 1300 (processor), and at least one memory circuit 1320 (memory). The processor 1300 is connected to communicate with the other components. The memory 1320 stores program instructions that are executed by the processor 1300 to perform operations disclosed herein. The processor 1300 may include one or more data processing circuits (e.g., microprocessor and/or digital signal processor), which may be collocated or distributed across one or more data networks. The processor 1300 is configured to execute computer program instructions in the memory 1320, described below as a non-transitory computer readable medium, to perform some or all of the operations and methods for one or more of the embodiments disclosed herein for a mobile electronic device.

Cloud Implementation

Some or all operations described above as being performed by the user terminal emulation server 100, the EAP authenticator 400, the AKMA system 900 or server 910, or the I/O user devices 130 may alternatively be performed by the other one, and/or by another node that is part of a cloud computing resource. For example, those operations can be performed as a network function that is close to the edge, such as in a cloud server or a cloud resource of a telecommunications network operator, e.g., in a CloudRAN or a core network, and/or may be performed by a cloud server or a cloud resource of a media provider, e.g., iTunes service provider or Spotify service provider.

Abbreviations

3GPP 3$^{rd}$ Generation Partnership Project
App Application, i.e. program
eNB Evolved Node B (a.k.a. RBS, Radio Base Station)
GW Gateway (also. acronym for Leif GW Persson)
ICMP Internet Control Message Protocol
IOD Input-Output Device
ITU International Telecommunication Union
RTP Real Time Protocol
RTCP Real Time Control Protocol
IOD Input Output Device
IODH Input Output Device Handler NTP Network Time Protocol
SDP Session Description Protocol
SR Sender Response
UE User equipment

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A user terminal emulation server for providing a communication service through input and/or output, I/O, user devices, the user terminal emulation server comprising:

at least one processor; and at least one memory storing program code that is executable by the at least one processor to perform operations comprising to:

establish a secure channel connection with a first I/O user device using a session identifier and an identifier associated with the first I/O user device to determine a first I/O user device specific key generated from a master key, the first I/O user device specific key and the session identifier being used for secure communication of messages with the first I/O user device;

receive an indication of an I/O user interface capability of the first I/O user device through the secure channel connection with the first I/O user device; and communicate with the first I/O user device to use the I/O user interface capability to provide at least part of the communication service for a user.

2. The user terminal emulation server of claim 1, wherein the operations further comprise to:

receive an EAP response through a communication channel with an Extensible Authentication Protocol, EAP, authenticator, the EAP response containing an identifier of a user tag;

communicate with the user tag to perform an EAP exchange for mutual authentication and establish the master key; and send an EAP success message to the EAP authenticator, wherein the EAP success message contains the master key and a session identifier associated with the master key, following the sending of the EAP success message to the EAP authenticator, perform the receiving of the indication of the I/O user interface capability of the first I/O user device and the communicating with the first I/O user device to use the I/O user interface capability to provide at least part of the communication service for the user.

3. The user terminal emulation server of claim 2, wherein the operations further comprise to:

store in a database the identifier of the user tag allowed to access the communication service;

store in the database a network address of the first I/O user device based on communications with the first I/O user device;

store in the database the first I/O user device specific key; and store in the database the indication of the I/O user interface capability of the first I/O user device.

4. The user terminal emulation server of claim 2, wherein the operations to establish the secure channel connection with the first I/O user device using the session identifier and the identifier associated with the first I/O user device to determine the first I/O user device specific key generated from the master key, comprise:

receive a secure channel connection request which includes the identifier of the first I/O user device and the session identifier;

initiate the determination of the first I/O user device specific key based on the master key;

store the first I/O user device specific key in the database with an association to the session identifier;

obtain the first I/O user device specific key from the database using the session identifier;

authenticate the first I/O user device based on the first I/O user device specific key; and setup the secure channel connection with the first I/O user device responsive to authentication of the first I/O user device.

5. The user terminal emulation server of claim 2, wherein the operations further comprise to:

obtain an identifier of a second I/O user device that is proximately located to the first I/O user device and has an I/O user interface capability that satisfies a rule for being combinable with the I/O user interface capability of the first I/O user device to provide the communication service;

establish the secure channel connection with the second I/O user device based on the master key being used to generate a second I/O user device specific key using the identifier for the second I/O user device;

communicate with the second I/O user device to use the I/O user interface capability of the second I/O user device to provide another part of the communication service for the user.

6. The user terminal emulation server of claim 1, wherein the operations further comprise to:

authenticate an identifier of a user tag or a user;

receive the identifier of the first I/O user device;

generate the first I/O user device specific key through communications with a 3GPP key agreement function.

7. The user terminal emulation server of claim 6, wherein the 3GPP key agreement function comprises one of: an Authentication and Key Management for Applications, AKMA, function; a Generic Bootstrapping Architecture, GBA, function; and a Battery Efficient Security for very low Throughput Machine Type Communication function.

8. The user terminal emulation server of claim 6, wherein the operation to generate the first I/O user device specific key through communication with the 3GPP key agreement function, comprise to:

generate the first I/O user device specific key based on processing the master key derived through the 3GPP key agreement function.

9. The user terminal emulation server of claim 6, wherein the operations further comprise to:

communicate with the AKMA function hosted in a mobile operator system to generate a shared secret between the user terminal emulation server and the 3GPP key agreement function.

10. An Extensible Authentication Protocol, EAP, authenticator comprising:

at least one processor; and at least one memory storing program code that is executable by the at least one processor to perform operations comprising to:

receive, from a first I/O user device, an EAP response which contains an identifier of a user tag containing an address of a user terminal emulation application hosted by a user terminal emulation server;

establish a communication channel with the user terminal emulation application based on the address in the user tag of the user terminal emulation application;

send at least one EAP message based on the EAP response through the communication channel with the user terminal emulation application;

receive an EAP success message from the user terminal emulation application, wherein the EAP success message contains a master key and a session identifier;

generate, based on the master key, a first I/O user device specific key; and send to the first I/O user device the first I/O user device specific key, the session identifier, and the address for the user terminal emulation application.

11. The EAP authenticator of claim 10, where the at least one EAP message is sent through the communication channel to the user terminal emulation application using DIAMETER protocol or RADIUS protocol.

12. The EAP authenticator of claim 10, wherein the operations further comprise to:

communicate with the user tag to perform an EAP exchange for mutual authentication.

13. The EAP authenticator of claim 11, wherein the first I/O user device specific key is generated based on a key derivation function performed on the master key and an identifier of the first I/O user device.

14. The EAP authenticator of claim 10, wherein the operations further comprise to:

obtain an identifier of a second I/O user device that is proximately located to the first I/O user device and has an I/O user interface capability that satisfies a rule for being combinable with the I/O user interface capability of the first I/O user device to provide a communication service;

generate, based on the master key, a second I/O user device specific key; and send to the second I/O user device, the second I/O user device specific key, the session identifier, and the address for the user terminal emulation application.

15. A first input and/or output, I/O, user device comprising:

at least one processor; and at least one memory storing program code that is executable by the at least one processor to perform operations comprising to:

receive from a user tag an attach request;

forward the attach request to an authenticator;

forward to the user tag an identity request received from the authenticator;

forward to the authenticator a response received from the user tag, the response which contains an identifier of the user tag containing an address of a user terminal emulation application hosted by a user terminal emulation server;

receive from the authenticator a message comprising a first I/O user device specific key for the first I/O user device, a session identifier, and the address for the user terminal emulation application;

establish a secure channel connection with the user terminal emulation application using the first I/O user device specific key and the session identifier received from the authenticator;

send an indication of an I/O user interface capability of the first I/O user device to the user terminal emulation application through the secure channel connection; and communicate with the user terminal emulation server to use the I/O user interface capability of the first I/O user device to provide at least part of a communication service to a user.

16. The first I/O user device of claim 15, wherein the operation to establish the secure channel connection with the user terminal emulation application using the first I/O user device specific key and the session identifier received from the authenticator, comprises:

sending the session identifier and an identifier of the first I/O user device to the user terminal emulation application to indicate which I/O user device specific key is to be used to establish the secure channel connection.

17. The first I/O user device of claim 15, further comprising:

a near-field communication, NFC, reader circuit configured to power the user tag to send the attach request.

18. A user tag which is transportable by a user and comprising circuitry configured to:

send to a first input and/or output, I/O, user device an attach request;

receive from the first I/O user device an identity request by an authenticator;

send upon said identity request, to the first I/O user device a response which contains an identifier of the user tag and an address of a user terminal emulation application hosted by a user terminal emulation server; and communicate with the user terminal emulation application to perform an exchange for mutual authentication and establish a master key used to generate one or more I/O user device specific keys.

19. The user tag of claim 18, wherein:

the circuitry is powered by NFC reader circuitry of the first I/O user device to send the attach request, to receive the identity request, to send the response, and to communicate with the user terminal emulation application to perform the exchange.

20. The user tag of claim 18, wherein the circuitry is further configured to:

generate the identifier of the user tag based on hashing a public key of the user tag.

* * * * *